(12) United States Patent
Zarifi et al.

(10) Patent No.: US 11,546,114 B2
(45) Date of Patent: Jan. 3, 2023

(54) SOUNDING REFERENCE SIGNAL CONFIGURATION FOR NEW RADIO POSITIONING

(71) Applicants: Keyvan Zarifi, Ottawa (CA); Javad Abdoli, Kanata (CA)

(72) Inventors: Keyvan Zarifi, Ottawa (CA); Javad Abdoli, Kanata (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 54 days.

(21) Appl. No.: 16/868,661

(22) Filed: May 7, 2020

(65) Prior Publication Data

US 2020/0358576 A1 Nov. 12, 2020

Related U.S. Application Data

(60) Provisional application No. 62/846,008, filed on May 10, 2019.

(51) Int. Cl.
  *H04L 5/00* (2006.01)
  *H04W 72/04* (2009.01)
  *H04L 43/08* (2022.01)

(52) U.S. Cl.
  CPC .......... *H04L 5/0053* (2013.01); *H04L 5/0048* (2013.01); *H04L 43/08* (2013.01); *H04W 72/042* (2013.01)

(58) Field of Classification Search
  CPC ..... H04L 5/0053; H04L 5/0048; H04L 43/08; H04W 72/042
  See application file for complete search history.

(56) References Cited

U.S. PATENT DOCUMENTS

| | | | |
|---|---|---|---|
| 2011/0261716 A1* | 10/2011 | Kim | H04L 25/0226 370/252 |
| 2014/0135027 A1* | 5/2014 | Kodali | H04W 72/1278 455/452.1 |
| 2018/0167895 A1* | 6/2018 | Lee | H04W 52/24 |
| 2018/0287870 A1 | 10/2018 | Yerramalli et al. | |
| 2019/0053103 A1* | 2/2019 | Manolakos | H04W 72/0493 |
| 2019/0174466 A1* | 6/2019 | Zhang | H04L 5/0048 |
| 2020/0235877 A1* | 7/2020 | Manolakos | H04W 24/08 |
| 2020/0264261 A1* | 8/2020 | Akkarakaran | H04W 76/27 |

FOREIGN PATENT DOCUMENTS

| | | |
|---|---|---|
| CN | 101541029 A | 9/2009 |
| CN | 107743060 A | 2/2018 |
| CN | 108737051 A | 11/2018 |
| WO | 2018174401 A1 | 9/2018 |

OTHER PUBLICATIONS

Huawei et al., "UL SRS design for beam management and CSI acquisition", 3GPP TSG RAN WG1 Meeting #90, R1-1712238, Prague, Czech Republic, Aug. 21-25, 2017, total 12 pages.
Qualcomm Incorporated: "DL and UL Reference Signals for NR Positioning", 3GPP Draft; R1-1905033, Apr. 3, 2019, total 10 pages.
CATT: "UL Reference Signals for NR Positioning", 3GPP Draft; R1-1906306, May 4, 2019, pp. 1-7, XP051708341.

* cited by examiner

Primary Examiner — Duc C Ho

(57) ABSTRACT

Aspects of the present application provide methods and devices in a communication network that aid in implementing sounding reference signal (SRS) measurement by multiple cells (i.e. serving cells and non-serving cells, also known as "neighbor cells") as well as NR LMUs.

20 Claims, 21 Drawing Sheets

SOUNDING REFERENCE SIGNAL CONFIGURATION FOR NEW RADIO POSITIONING

RELATED APPLICATIONS

This application claims the benefit of priority of U.S. Provisional Patent Application 62/846,008 filed on May 10, 2019, which is hereby incorporated by reference in its entirety.

TECHNICAL FIELD

The present disclosure relates generally to wireless communications, and in particular embodiments, to systems and methods for configuring and utilizing a sounding reference signal (SRS) for determining user equipment positioning.

BACKGROUND

In traditional cellular networks, each cell is associated with a coverage area and includes one or multiple transmit-receive points (TRPs), each comprising a radio frequency transceiver for transmitting and receiving wireless signals.

Other than TRPs that can in general transmit/receive both data and control channel signals, the network may be equipped with other physical entities such as new radio location measurement units (NR LMUs) or Transmit Measurement Function (TMFs) units. The NR LMU or TMF may be
- integrated with a cell or a TRP that belongs to the cell; or
- collocated with a cell or a TRP that belongs to the cell and share antennas with it; or
- located elsewhere within a coverage area of a cell and has its own antennas.

In contrast to LTE LMUs that only measure received sounding reference signal (SRS) from a UE for the purpose of determining the location of the UE, NR LMUs or TMFs comprise at least a radio frequency receiver/transmitter for receiving/transmitting wireless signals such as reference signals received from/transmitted to the UEs. These reference signals are used in the process of determining the location of the UE. NR LMUs or TMFs typically forward the acquired measurements to another network entity called a location measurement function (LMF). Examples of the LMF include Enhanced (or Evolved) Serving Mobile Location Center (E-SMLC), or LTE location measurement function (LMF) or new radio location measurement function (NR LMF). The final positioning (determining the location) of the UE is performed by the LMF.

UEs transmit a SRS that can be used by a network side device in determining channel characteristics about the channel between the UE and network device. After measuring the SRS, the network side device can tailor transmission characteristics for downlink transmission from the network side device to the UE. Currently, SRS is used with regard to a network side device that serves the UE, i.e. a serving cell. That is, the SRS is meant to be measured only by the serving cell.

SRS for the New Radio (NR) standard is currently configured for four different usages: 1) Beamforming, 2) Codebook-based transmission, 3) Non-codebook-based transmission, and 4) Antenna switching (for the purpose of DL CSI acquisition).

Currently SRS is not configured for a usage that includes UL-based positioning. To enable a UL-based positioning usage, the SRS should be measured by more than just the serving cell.

Other practical scenarios in additional to UL-based positioning, such as UL-based mobility, may benefit from the UE being able to effectively transmit SRS to cells other than only the serving cell.

In order to utilize SRS for determining UE positioning, the SRS signaling must be configured for use. Various problems may be encountered pertaining to configuring UEs by the serving cell and notifying neighboring cells, neighboring base stations (gNBs), NR LMUs, TMFs of the configuration. In particular, latency issues between the serving cell notifying the UEs of SRS configuration information and the UEs being able to initiate such SRS configuration information and the serving cell notifying the neighboring cells, neighboring gNBs, NR LMUs, TMFs of the SRS configuration information and the neighboring cells, neighboring gNBs, NR LMUs, TMFs being able to adjust to receiving the SRS on newly configured or activated resources. The serving cell notifying the UEs of SRS configuration information and the UEs being able to initiate such SRS configuration information can typically occur in a shorter time frame than the serving cell notifying the neighboring cells, neighboring gNBs, NR LMUs, TMFs of the SRS configuration information and the neighboring cells, neighboring gNBs, NR LMUs, TMFs being able to adjust to receiving the SRS on newly configured or activated resources. In addition, there is the possibility of interference issues between the SRS from UEs in a given cell and other uplink (UL) transmissions that a neighboring cell, neighboring gNBs, may be receiving from UEs that it is serving.

SUMMARY

There are potential latency issues and interferences issues surrounding the configuration and use of sounding reference signals (SRS) for determining positioning of UEs related to serving cells and neighboring cells/gNBs, NR LMUs, TMFs. Three specific problems are identified below that mainly focus on neighboring cells/gNBs as examples.

A first potential problem pertains to latency involved in communicating a bandwidth part (BWP) switching indication by the serving cell/gNB to UEs being served by the serving cell and communicating the BWP switching indication to neighboring cells/gNBs that may be monitoring and measuring SRS from the UEs in order to aid in determining the positioning of the UEs or for the purpose of UL-based mobility.

A second problem relates to inter-cell UL interference. SRS transmission of a UE in a first cell and UL transmissions, such as physical uplink shared channel (PUSCH) transmissions or physical uplink control channel (PUCCH) transmissions, of a UE in the second cell may interfere with one another. This can be especially disruptive for positioning determination purposes as the SRS of the UE in the first cell needs to be detected by the neighboring cell/gNB for the desired positioning procedure.

A third problem is a second latency related problem pertaining to inter-cell/inter-gNB latency using XnAP or NR PPa protocols to communicate SP-SRS activation and de-activation commands or an AP-SRS triggering message. The XnAP and NR PPa inter-cell or inter-gNB latency related to the serving cell communicating a notification to the neighboring cell is far larger than the latency related to the serving cell transmitting the activation and de-activation commands in a MAC-CE for the purpose of the SP-SRS transmission activation and de-activation by the UE. Likewise, the XnAP and NR PPa inter-cell or inter-gNB latency is far larger than the latency between the serving cell sending a triggering DCI and a resulting AP-SRS transmission being initiated by the UE.

Aspects of the present disclosure provide solutions for the problems listed above. The solutions may include one or more of the following functionalities: defining a dedicated "positioning bandwidth (BW)" for transmitting SRS used for determining UE position that is independent of an active BWP; utilizing a SRS carrier switching feature to support the dedicated positioning BW; transmitting SRS used for UE positioning determination in the original active UL BWP after active UL BWP switching has occurred and until the SRS transmission is deactivated or instructed to be stopped by the network; delaying switching of SRS used for UE positioning determination from the original active UL BWP to a new active UL BWP for a period of time after active UL BWP switching occurs; blind detection of the SRS on multiple UL BWPs; and increasing latency between a received command and the corresponding UE action by modification of current latency parameters being used by the UE via DCI or MAC-CE.

Aspects of the present application provide methods and devices in a communication network that aid in implementing SRS measurement by multiple cells (i.e. serving cells and non-serving cells, also known as "neighbor cells") or NR location management units (LMUs) or any other logical or physical entity at the network side, such as a Transmission Measurement Function (TMF), that is tasked to measure SRS for the purpose of positioning and/or mobility. The physical or logical measurement entity, such as the TMF, may be a part of the distributed unit gNB (gNB-DU) (or cell) where the gNB (or cell) may be a serving or a non-serving (neighboring) gNB (or cell). This enhanced SRS measurement based on multiple cell and/or multiple gNBs and/or NR LMU and/or TMF measurements may facilitate more beneficial usages such as UL-based positioning and UL-based mobility.

According to a first aspect of the present disclosure there is provided a method including: receiving, by a user equipment (UE), a first message from a network device in a serving cell, wherein the first message indicates a configuration of at least one configured bandwidth (BW) for sounding reference signal (SRS) transmission used for determining a position of the UE; sending, by the UE, the SRS transmission on the at least one configured BW to at least one of the network device in the serving cell and a network device in a neighboring cell; wherein the at least one configured BW includes an active bandwidth part (BWP) or a positioning BW.

In some embodiments, the method further includes receiving, by the UE, a second message from the network device in the serving cell, wherein the second message indicates a deactivation command for the at least one configured BW.

In some embodiments, the second message is an explicit indication to deactivate the SRS or an implicit indication to deactivate the SRS, wherein the implicit indication includes at least one of: the UE receiving location information; the UE receiving a location information acknowledgement; the UE receiving an activation command for SRS in a new configured BW; a delay period; and expiration of a timer.

In some embodiments, the method further includes SRS activation in a different configured BW when the UE receives an implicit indication to deactivate the SRS or an explicit deactivation command for the SRS in the at least one configured BW.

In some embodiments, the method further includes receiving an indication of the delay period in: a radio resource control (RRC) message; or a downlink control information (DCI).

In some embodiments, the delay period starts from: in a case of DCI based BWP switching, a slot where the UE receives the message to trigger switching from the first BWP to the second BWP; or in a case of timer-based switching, a slot during which a BWP switching timer expires.

In some embodiments, the delay period or the timer is started upon receiving a BWP switching command.

In some embodiments, the method further includes: receiving, by the UE, a third message from the network device in the serving cell, wherein the third message indicates a gap configuration, wherein the gap configuration is used for: allowing transmission of the SRS on a first BWP of the at least one configured BW while interrupting scheduled or configured UL transmissions in a second BWP of the at least one configured BW; or interrupting SRS transmission occasions on the first BWP of the at least one configured BW to allow scheduled or configured UL transmissions on the second BWP of the at least one configured BW.

In some embodiments, the positioning BW is any one of the following: a BWP of a configured cell/carrier; a sub-band of a configured cell/carrier; and independent of a configured cell/carrier.

In some embodiments, the BWP of the configured cell/carrier includes at least one of the following: a UE-specific uplink (UL) BWP configured using a regular UL BWP configuration; a separate BWP configured with a smaller subset of radio resource control (RRC) parameters than that of a regular UL BWP; a separate BWP with or without physical uplink shared channel (PUSCH) and/or physical uplink control channel (PUCCH) transmitted in the separate BWP; an initial UL BWP; and a default UL BWP.

In some embodiments, the method further includes receiving, by the UE, from the network device in the serving cell positioning bandwidth configuration information.

In some embodiments, the method further includes the UE receiving downlink control information (DCI) to trigger transmission of a sounding reference signal (SRS) used for determining the position of the UE, wherein for each cell indicated in a "srs-TPC-PDCCH-Group" field in the DCI performing at least one of: the UE transmitting the SRS that is configured in the active UL BWP for the activated cell or the UE transmitting the SRS that is configured in the UL BWP with index provided by a "firstActiveUplinkBWP-Id" field in the DCI for the activated or de-activated cell; the UE transmitting the SRS that is configured in the positioning BW; and the UE transmitting the SRS in a UL BWP indicated in the DCI.

According to a second aspect of the present disclosure there is provided a user equipment (UE) including a processor and a computer-readable medium having stored thereon instructions for implementing a method as described above or below.

According to a third aspect of the present disclosure there is provided an apparatus including a processor and a computer-readable medium. The computer-readable medium has stored thereon instructions that when executed by the processor cause the apparatus to: receive a first message from a network device in a serving cell, wherein the first message indicates a configuration of at least one configured bandwidth (BW) for sounding reference signal (SRS) transmission used for determining a position of the UE; send the SRS transmission on the at least one configured BW to at least one of the network device in the serving cell and a network device in a neighboring cell; wherein the at least one configured BW comprises an active bandwidth part (BWP) or a positioning BW.

In some embodiments, the apparatus further includes instructions that when executed by the processor cause the apparatus to receive, by the UE, a second message from the network device in the serving cell, wherein the second message indicates a deactivation command for the at least one configured BW.

In some embodiments, the second message is an explicit indication to deactivate the SRS or an implicit indication to deactivate the SRS, wherein the implicit indication comprises at least one of: the UE receiving location information; the UE receiving a location information acknowledgement; the UE receiving an activation command for SRS in a new configured BW; a delay period; and expiration of a timer.

In some embodiments, the apparatus further includes instructions that when executed by the processor cause the apparatus to perform SRS activation in a different configured BW when the UE receives an implicit indication to deactivate the SRS or an explicit deactivation command for the SRS in the at least one configured BW.

In some embodiments, the apparatus further includes instructions that when executed by the processor cause the apparatus to receive an indication of the delay period in: a radio resource control (RRC) message; or a downlink control information (DCI).

According to a fourth aspect of the present disclosure there is provided a method involving transmitting, by a network device, a first message to at least one user equipment (UE), wherein the first message indicates a configuration of at least one configured bandwidth (BW) for sounding reference signal (SRS) transmission used for determining a position of the UE; receiving, by the network device, the SRS transmission from the at least one UE on the at least one configured BW; wherein the at least one configured BW comprises an active bandwidth part (BWP) or a positioning BW.

In some embodiments, the method further involves transmitting, by the network device, a second message to the at least one UE, wherein the second message indicates a deactivation command for the at least one configured BW.

In some embodiments, the second message is an explicit indication to deactivate the SRS or an implicit indication to deactivate the SRS, wherein the implicit indication comprises at least one of: the UE receiving location information; the UE receiving a location information acknowledgement; the UE receiving an activation command for SRS in a new configured BW; a delay period; and expiration of a timer.

In some embodiments, the method further comprising SRS activation in a different configured BW when the UE receives an implicit indication to deactivate the SRS or an explicit deactivation command for the SRS in the at least one configured BW.

In some embodiments, the method further involves transmitting an indication of the delay period in: a radio resource control (RRC) message; or a downlink control information (DCI).

According to a fifth aspect of the present disclosure there is provided an apparatus including a processor and a computer-readable medium. The computer-readable medium has stored thereon instructions that when executed by the processor cause the apparatus to: transmit a first message to at least one user equipment (UE), wherein the first message indicates a configuration of at least one configured bandwidth (BW) for sounding reference signal (SRS) transmission used for determining a position of the UE; receive the SRS transmission from the at least one UE on the at least one configured BW; wherein the at least one configured BW comprises an active bandwidth part (BWP) or a positioning BW.

In some embodiments, the apparatus further includes instructions that when executed by the processor cause the apparatus to transmit a second message from the network device in the serving cell, wherein the second message indicates a deactivation command for the at least one configured BW.

In some embodiments, the second message is an explicit indication to deactivate the SRS or an implicit indication to deactivate the SRS, wherein the implicit indication comprises at least one of: the UE receiving location information; the UE receiving a location information acknowledgement; the UE receiving an activation command for SRS in a new configured BW; a delay period; and expiration of a timer.

In some embodiments, the apparatus further includes instructions that when executed by the processor cause the apparatus to perform SRS activation in a different configured BW when the UE receives an implicit indication to deactivate the SRS or an explicit deactivation command for the SRS in the at least one configured BW.

In some embodiments, the apparatus further includes instructions that when executed by the processor cause the apparatus to transmit an indication of the delay period in: a radio resource control (RRC) message; or a downlink control information (DCI).

According to a sixth aspect of the present disclosure there is provided a method including: transmitting, by a network device in a serving cell, a first message to at least one of a user equipment (UE); transmitting, by the network device in the serving cell, the first message to a location management function (LMF) or a network device in a neighboring cell, wherein the first message indicates a configuration of at least one configured bandwidth (BW) for sounding reference signal (SRS) transmission used for determining a position of the UE; receiving, by the network device in the serving cell, the SRS transmission on the at least one configured BW from the UE; wherein the at least one configured BW includes an active bandwidth part (BWP) or a positioning BW.

In some embodiments, the method further includes: transmitting, by the network device in the serving cell, a second message to at least one of the UE, the LMF and the network device in the neighboring cell, wherein the second message indicates a deactivation command for the at least one configured BW.

In some embodiments, the second message is an explicit indication to deactivate the SRS or an implicit indication to deactivate the SRS, wherein the implicit indication includes at least one of: the network device of the serving cell transmitting location information; the network device of the serving cell transmitting a location information acknowledgement; and the network device of the serving cell transmitting an activation command for SRS in a new configured BW.

In some embodiments, the method further includes the network device in the serving cell transmitting an implicit indication to deactivate the SRS or an explicit deactivation command for the SRS in the at least one configured BW.

In some embodiments, the method further includes: the network device in the serving cell transmitting a third message to at least one of the UE, the LMF and the network device in the neighboring cell, wherein the third message indicates a gap configuration, wherein the gap configuration is used for: allowing transmission of the SRS on a first BWP while interrupting scheduled or configured UL transmissions in a second BWP; or interrupting SRS transmission occasions on the first BWP to allow scheduled or configured UL transmissions on the second BWP.

In some embodiments, the positioning BW is any one of the following: a BWP of a configured cell/carrier; a sub-band of a configured cell/carrier; independent of a configured cell/carrier.

In some embodiments, the BWP of the configured cell/carrier includes at least one of the following: a UE-specific uplink (UL) BWP configured using a regular UL BWP configuration; a separate BWP configured with a smaller subset of radio resource control (RRC) parameters than that of a regular UL BWP; a separate BWP with or without physical uplink shared channel (PUSCH) and/or physical uplink control channel (PUCCH) transmitted in the separate BWP; an initial UL BWP; and a default UL BWP.

In some embodiments, the method further includes the network device in the serving cell transmitting positioning bandwidth configuration information.

In some embodiments, the method further includes the network device in the serving cell transmitting downlink control information (DCI) to the UE to trigger transmission of a sounding reference signal (SRS) used for determining the position of the UE, wherein for each cell indicated in a "srs-TPC-PDCCH-Group" field in the DCI performing at least one of: the network device in the serving cell receiving the SRS that is configured in the active UL BWP for the activated cell or the network device in the serving cell receiving the SRS that is configured in the UL BWP with index provided by a "firstActiveUplinkBWP-Id" field in the DCI for the activated or de-activated cell; the network device in the serving cell receiving the SRS that is configured in the positioning BW; and the network device in the serving cell receiving the SRS in a UL BWP indicated in the DCI.

According to a seventh aspect of the present disclosure there is provided a network device including: a processor; and a computer-readable medium having stored thereon instructions for implementing a method as described above or detailed below.

According to an eighth aspect of the present disclosure there is provided a method including: receiving, by a first network device in a neighboring cell, a first message from a second network device, wherein the first message indicates a configuration of at least one configured bandwidth (BW) for sounding reference signal (SRS) transmission used for determining a position of a user equipment (UE); receiving, by the first network device in the neighboring cell, the SRS transmission on the at least one configured BW from the UE; detecting, by the first network device in the neighboring cell, the SRS transmission; wherein the second network device is a network device in a serving cell or a location management function (LMF), and the at least one configured BW includes an active bandwidth part (BWP) or a positioning BW.

In some embodiments, the method further includes: receiving, by the first network device in the neighboring cell, a second message from the second network device, wherein the second message indicates a deactivation command for the at least one configured BW.

In some embodiments, the second message is an explicit indication that SRS transmitted by the UE for positioning is being deactivated or an implicit indication that SRS transmitted by the UE for positioning is being deactivated, wherein the implicit indication includes at least one of: location information being provided to the UE; a location information acknowledgement being provided to the UE; an activation command for SRS in a new configured BW; a delay period; and expiration of a timer.

In some embodiments, the method further includes determining as SRS activation occurs in a different configured BW when an implicit indication that SRS transmitted by the UE for positioning is being deactivated or an explicit deactivation command that SRS transmitted by the UE for positioning is being deactivated in the at least one configured BW.

In some embodiments, the positioning BW is any one of the following: a BWP of a configured cell/carrier; a sub-band of a configured cell/carrier; independent of a configured cell/carrier.

In some embodiments, the BWP of the configured cell/carrier includes at least one of the following: a UE-specific uplink (UL) BWP configured using a regular UL BWP configuration; a separate BWP configured with a smaller subset of radio resource control (RRC) parameters than that of a regular UL BWP; a separate BWP with or without physical uplink shared channel (PUSCH) and/or physical uplink control channel (PUCCH) transmitted in the separate BWP; an initial UL BWP; and a default UL BWP.

In some embodiments, detecting the SRS transmission includes performing blind detection of the at least one configured bandwidth BW.

In some embodiments, the method further includes receiving positioning bandwidth configuration information.

According to a ninth aspect of the present disclosure there is provided a network side device including: a processor; and a computer-readable medium having stored thereon instructions for implementing a method as described above or detailed below.

According to a tenth aspect of the present disclosure there is provided a method including: a user equipment (UE) updating a latency value defining a duration between the UE receiving a command to activate, de-activate or trigger transmission of a sounding reference signal (SRS) used for determining the position of the UE and the UE performing the activating, de-activating or triggering of the transmission of the SRS by the UE; the UE receiving the command to activate, de-activate or trigger the transmission of the SRS used for determining the position of the UE; and the UE transmitting the SRS used for determining the position of the UE based on the updated latency value.

In some embodiments, updating a latency value includes increasing the latency value to be equal to $XN_{slot}^{subframe,\mu}+1$ for activing or deactivating semi-persistent SRS (SP-SRS), where X and $N_{slot}^{subframe,\mu}$ are integer values.

In some embodiments, updating a latency value includes increasing the latency value, which is equal to K for triggering aperiodic SRS (AP-SRS), to a larger value than the current value of K, where K is an integer value.

In some embodiments, the method further includes receiving a new latency value to be used in updating an existing latency value used by the UE.

According to an eleventh aspect of the present disclosure there is provided a method including: a network device in a serving cell transmitting to a user equipment (UE) a command to activate, de-activate or trigger transmission of SRS used for determining the position of the UE; the network device in the serving cell transmitting to a location management function (LMF) or a network device in a neighboring cell a notification that the command to activate, de-activate or trigger transmission of SRS used for determining the position of the UE has been sent or will be sent to the UE; and the network device in the serving cell receiving the SRS used for determining the position of the UE.

In some embodiments, the method further includes transmitting a new latency value to the UE that is different than an existing latency value used by the UE, the new latency value to be used to update a duration between the UE receiving the command to activate, de-activate or trigger transmission of a sounding reference signal (SRS) used for determining the position of the UE and the UE performing the command of activating, de-activating or triggering of the transmission of the SRS by the UE.

BRIEF DESCRIPTION OF THE DRAWINGS

For a more complete understanding of the present embodiments, and the advantages thereof, reference is now made, by way of example, to the following descriptions taken in conjunction with the accompanying drawings, in which.

DETAILED DESCRIPTION OF ILLUSTRATIVE EMBODIMENTS

Figure 1:
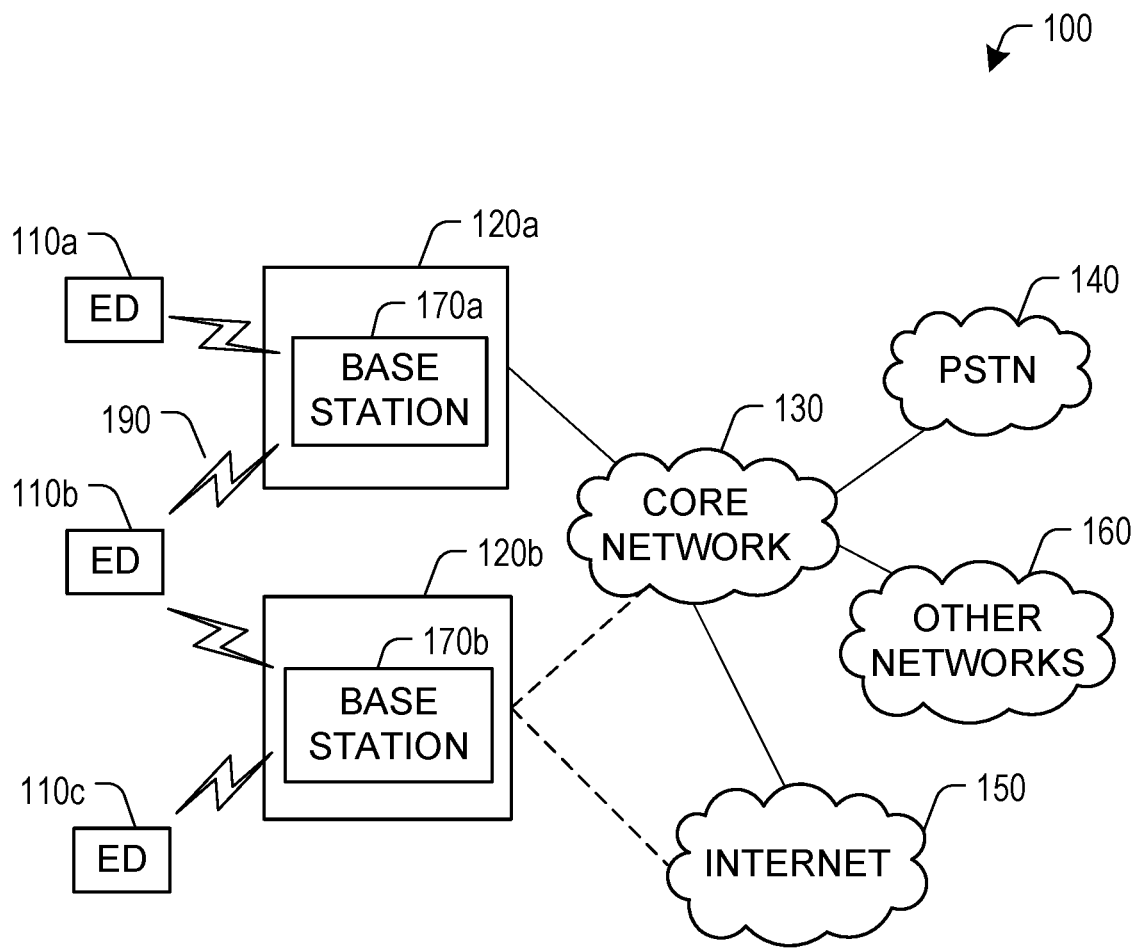
FIG. 1 illustrates an example communication system in which embodiments of the present disclosure could be implemented.

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

Existing procedures that have been accepted into the New Radio (NR) standard do not provide for multiple cell SRS measurement. Currently, a UE is only expected to transmit a sounding reference signal (SRS) for the measurement at a TRP associated with a serving cell. Aspects of the present application provide methods and devices in a communication network that aid in implementing SRS measurement by multiple cells (i.e. serving cells and non-serving cells, also known as "neighbor cells") or NR location management units (LMUs) or any other logical or physical entity at the network side, such as a Transmission Measurement Function (TMF), that is tasked to measure SRS for the purpose of positioning and/or mobility. The physical or logical measurement entity, such as the TMF, may be a part of the distributed unit gNB (gNB-DU) (or cell) where the gNB (or cell) may be a serving or a non-serving (neighboring) gNB (or cell). This enhanced SRS measurement based on multiple cell and/or multiple gNBs and/or NR LMU and/or TMF measurements may facilitate more beneficial usages such as UL-based positioning and UL-based mobility.

In order to enable this enhanced SRS measurement, new methods are proposed. Some of the new methods may involve modifying some known methodologies. Modifying existing methods may allow for easier implementation based on existing accepted methods. In order to enable multiple cell and/or multiple gNBs and/or NR LMU and/or TMF SRS measurement, there are several issues that need to be addressed with respect to the conventional NR SRS measurement, which only relies on the serving cell.

SRS in Release 15 (Rel. 15) is transmitted in an active UL BWP of an active serving cell. The active UL BWP can be dynamically switched by the serving cell by sending downlink control information (DCI) to the UE or using a timer. Once the active UL BWP is switched to a new active UL BWP, the SRS transmission in the original active UL BWP stops. If the UE is configured with a periodic SRS (P-SRS) in the new active UL BWP, the UE starts transmitting the SRS in the new active UL BWP. Both semi-persistent SRS (SP-SRS) and aperiodic SRS (AP-SRS) are supported in Rel. 15. In the case of SP-SRS, the serving cell sends an activation or de-activation message to the UE in a media access control-control element (MAC-CE). In the case of AP-SRS, the serving cell sends a triggering message to the UE in DCI.

Rel. 16 is considering a positioning determination application. Unlike in Rel. 15 applications, Rel. 16 is proposing that positioning SRS needs to be received by neighboring cells/neighboring gNBs and/or TMFs and/or NR LMUs.

According to some aspects of the present disclosure, it may be beneficial to utilize SRS for multi-cell, multi-gNB, multi-NR LMU, multi-TMF SRS measurements for processes such as UL-based positioning or UL-based mobility, or both. In Rel. 15 NR, SRS is configured for four different usages: 1) Beamforming, 2) Codebook-based transmission, 3) Non-codebook-based transmission, and 4) Antenna switching (for the purpose of DL CSI acquisition). SRS resources are grouped into SRS resource sets. SRS usage is resource set specific. However, some UE procedures and behaviors and SRS configurations are different for different usages. Solutions to this issue will be addressed below in example embodiments.

As discussed above, there are potential latency issues and interferences issues surrounding the configuration and use of sounding reference signals (SRS) for determining positioning of UEs related to serving cells and neighboring cells/gNBs, NR LMUs, TMFs. Three specific problems are identified below that mainly focus on neighboring cells/gNBs as examples.

A first potential problem pertains to latency involved in communicating a bandwidth part (BWP) switching indication by the serving cell/gNB to UEs being served by the serving cell and communicating the BWP switching indication to neighboring cells/gNBs that may be monitoring and measuring SRS from the UEs in order to aid in determining the positioning of the UEs or for the purpose of UL-based mobility. The serving cell/gNB to neighboring cell/gNB communication link may be a direct link or it may occur via another network entity or function, such as a location management function (LMF). The LMF is an entity or function that requests positioning measurements from the measuring entities, such as cells or gNBs or NR LMUs or TMFs, receives the positioning measurements from those measuring entities and derives the UE position based on these measurements. In a case in which the LMF is used, communications between the serving cell/gNB and the LMF and communications between the LMF and each of the neighboring cells/gNBs performing measurements on the SRS occur through a protocol known as NR PPa (New Radio Positioning Protocol a). This protocol is described in detail in 38.455 for NR. The older version of this protocol that is used for LTE is called LPPa (LTE Positioning Protocol a) and is described in detail in 36.455. If a serving cell/gNB and a neighboring cell/gNB directly communicate without the LMF, the cells use a protocol known as XnAP (Xn Application protocol). XnAP is described in detail in 38.423 for NR. The older version of this protocol is called X2AP that is used for LTE and is described in detail in 36.423.

The inter-cell or inter-gNB latency using XnAP or NR PPa protocols is far larger than the latency in DCI based BWP switching, which involves the serving cells sending a command to a UE in DCI to switch transmission from a current active bandwidth part to a new active bandwidth part. Therefore, this means that the DCI is received by the UE and the command is implemented by the UE quicker than the message is sent by the serving cell/gNB and received by the neighbouring cell/gNB using the XnAP or NR PPa protocols. As a result, the neighboring cell/gNB may be unaware that the SRS is being transmitted on a different bandwidth part for a period of time until the neighboring cell receives the notification from the serving cell/gNB and can reconfigure itself to receive the SRS appropriately.

A second problem relates to inter-cell UL interference. SRS transmission of a UE in a first cell and UL transmissions, such as physical uplink shared channel (PUSCH) transmissions or physical uplink control channel (PUCCH) transmissions, of a UE in the second cell may interfere with one another. This can be especially disruptive for positioning determination purposes as the SRS of the UE in the first cell needs to be detected by the neighboring cell/gNB for the desired positioning procedure.

A third problem is a second latency related problem pertaining to inter-cell/inter-gNB latency using the XnAP or NR PPa protocols to communicate SP-SRS activation and de-activation commands or an AP-SRS triggering message. The XnAP and NR PPa inter-cell or inter-gNB latency related to the serving cell communicating a notification to the neighboring cell is far larger than the latency related to the serving cell transmitting the activation and de-activation commands in a MAC-CE for the purpose of the SP-SRS transmission activation and de-activation by the UE. Likewise, the XnAP and NR PPa inter-cell or inter-gNB latency is far larger than the latency between the serving cell sending a triggering DCI and a resulting AP-SRS transmission being initiated by the UE.

Aspects of the present disclosure provide solutions for the problems listed above. The solutions may include one or more of the following functionalities: defining a dedicated "positioning bandwidth (BW)" for transmitting SRS used for determining UE position that is independent of an active BWP; utilizing a SRS carrier switching feature to support the dedicated positioning BW; transmitting SRS used for UE positioning determination in the original active UL BWP after active UL BWP switching has occurred and until the SRS transmission is deactivated or instructed to be stopped by the network; delaying switching of SRS used for UE positioning determination from the original active UL BWP to a new active UL BWP for a period of time after active UL BWP switching occurs; blind detection of the SRS on multiple UL BWPs; and increasing latency between a received command and the corresponding UE action by modification of current latency parameters being used by the UE via DCI or MAC-CE.

FIGS. 1, 2, 3A and 3B following below provide context for the network and devices that may be in the network and that may implement aspects of the present disclosure.

FIG. 1 illustrates an example communication system 100 in which embodiments of the present disclosure could be implemented. In general, the system 100 enables multiple wireless or wired elements to communicate data and other content. The purpose of the system 100 may be to provide content (voice, data, video, text) via broadcast, narrowcast, user device to user device, etc. The system 100 may operate efficiently by sharing resources such as bandwidth.

In this example, the communication system 100 includes electronic devices (ED) 110a-110c, radio access networks (RANs) 120a-120b, a core network 130, a public switched telephone network (PSTN) 140, the Internet 150, and other networks 160. While certain numbers of these components or elements are shown in FIG. 1, any reasonable number of these components or elements may be included in the system 100.

The EDs 110a-110c are configured to operate, communicate, or both, in the system 100. For example, the EDs 110a-110c are configured to transmit, receive, or both via wireless communication channels. Each ED 110a-110c represents any suitable end user device for wireless operation and may include such devices (or may be referred to) as a user equipment/device (UE), wireless transmit/receive unit (WTRU), mobile station, mobile subscriber unit, cellular telephone, station (STA), machine type communication device (MTC), personal digital assistant (PDA), smartphone, laptop, computer, touchpad, wireless sensor, or consumer electronics device.

FIG. 1 illustrates an example communication system 100 in which embodiments of the present disclosure could be implemented. In general, the communication system 100 enables multiple wireless or wired elements to communicate data and other content. The purpose of the communication system 100 may be to provide content (voice, data, video, text) via broadcast, multicast, unicast, user device to user device, etc. The communication system 100 may operate by sharing resources such as bandwidth.

In this example, the communication system 100 includes electronic devices (ED) 110a-110c, radio access networks (RANs) 120a-120b, a core network 130, a public switched telephone network (PSTN) 140, the internet 150, and other networks 160. Although certain numbers of these components or elements are shown in FIG. 1, any reasonable number of these components or elements may be included in the communication system 100.

The EDs 110a-110c are configured to operate, communicate, or both, in the communication system 100. For example, the EDs 110a-110c are configured to transmit, receive, or both via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 1, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB, or, in short, eNB), a Home eNodeB, a gNodeB (or, in short, gNB), ng-eNB, NG-RAN node, a transmission and receive point (TRP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding. The communication system 100 may include RANs, such as RAN 120b, wherein the corresponding base station 170b accesses the core network 130 via the internet 150, as shown.

The EDs 110a-110c and base stations 170a-170b are examples of communication equipment that can be configured to implement some or all of the functionality and/or embodiments described herein. In the embodiment shown in FIG. 1, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments there may be established pico or femto cells where the radio access technology supports such. In some embodiments, multiple transceivers could be used for each cell, for example using multiple-input multiple-output (MIMO) technology. The number of RAN 120*a*-120*b* shown is exemplary only. Any number of RAN may be contemplated when devising the communication system 100.

The base stations 170*a*-170*b* communicate with one or more of the EDs 110*a*-110*c* over one or more air interfaces 190 using wireless communication links e.g. radio frequency (RF), microwave, infrared (IR), etc. The air interfaces 190 may utilize any suitable radio access technology. For example, the communication system 100 may implement one or more orthogonal or non-orthogonal channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170*a*-170*b* may implement Universal Mobile Telecommunication System (UMTS) Terrestrial Radio Access (UTRA) to establish an air interface 190 using wideband CDMA (WCDMA). In doing so, the base station 170*a*-170*b* may implement protocols such as High Speed Packet Access (HSPA), Evolved HPSA (HSPA+) optionally including High Speed Downlink Packet Access (HSDPA), High Speed Packet Uplink Access (HSUPA) or both. Alternatively, a base station 170*a*-170*b* may establish an air interface 190 with Evolved UTMS Terrestrial Radio Access (E-UTRA) using LTE, LTE-A, and/or LTE-B. It is contemplated that the communication system 100 may use multiple channel access functionality, including such schemes as described above. Other radio technologies for implementing air interfaces include IEEE 802.11, 802.15, 802.16, CDMA2000, CDMA2000 1×, CDMA2000 EV-DO, IS-2000, IS-95, IS-856, GSM, EDGE, and GERAN. Of course, other multiple access schemes and wireless protocols may be utilized.

The RANs 120*a*-120*b* are in communication with the core network 130 to provide the EDs 110*a*-110*c* with various services such as voice, data, and other services. The RANs 120*a*-120*b* and/or the core network 130 may be in direct or indirect communication with one or more other RANs (not shown), which may or may not be directly served by core network 130, and may or may not employ the same radio access technology as RAN 120*a*, RAN 120*b* or both. The core network 130 may also serve as a gateway access between (i) the RANs 120*a*-120*b* or EDs 110*a*-110*c* or both, and (ii) other networks (such as the PSTN 140, the internet 150, and the other networks 160). In addition, some or all of the EDs 110*a*-110*c* may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as internet protocol (IP), transmission control protocol (TCP) and user datagram protocol (UDP). EDs 110*a*-110*c* may be multimode devices capable of operation according to multiple radio access technologies, and incorporate multiple transceivers necessary to support such.

It is contemplated that the communication system 100 as illustrated in FIG. 1 may support a New Radio (NR) cell, which also may be referred to as hyper cell. Each NR cell includes one or more TRPs using the same NR cell ID. The NR cell ID is a logical assignment to all physical TRPs of the NR cell and may be carried in a broadcast synchronization signal. The NR cell may be dynamically configured. The boundary of the NR cell may be flexible and the system dynamically adds or removes TRPs to from the NR cell.

It is obviously understood that any number of NR cells may be implemented in the communication system 100. For example, FIG. 2 illustrates two neighboring NR cells in an example communication system, in accordance with an embodiment of the present disclosure.

Figure 2:
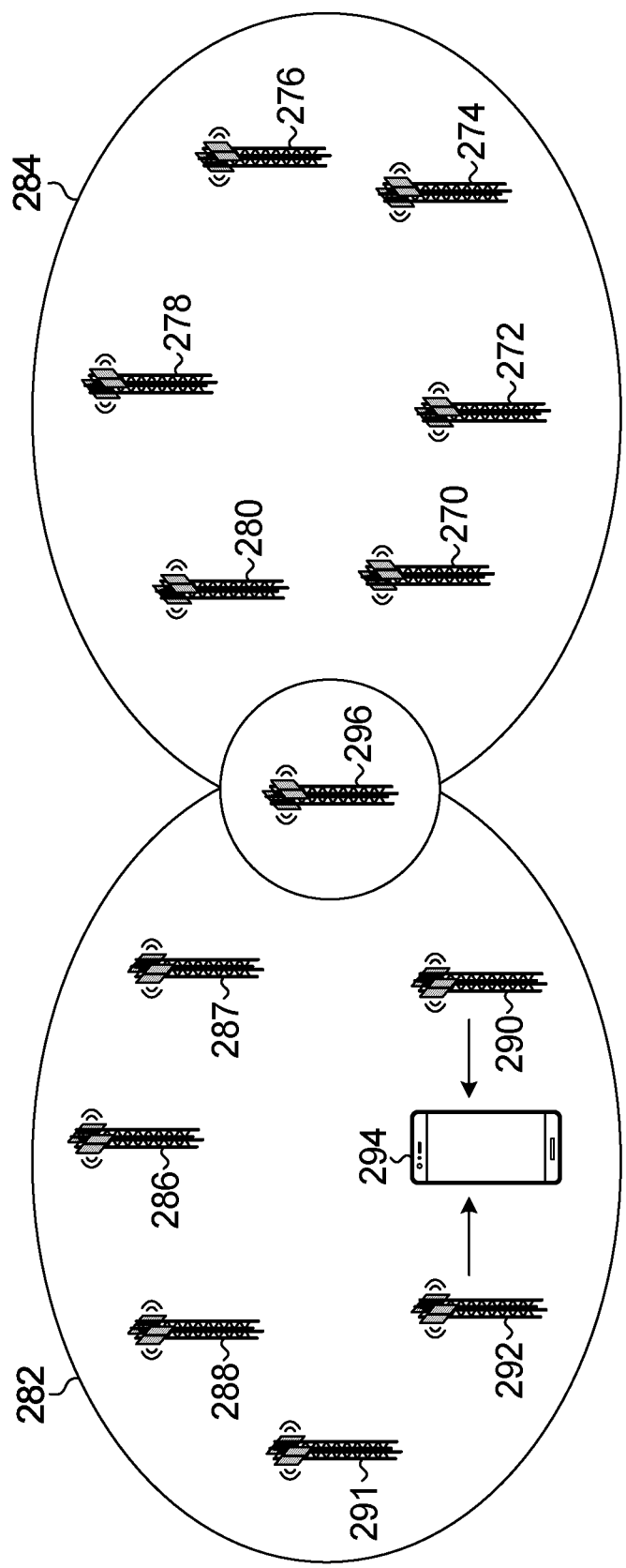
FIG. 2 illustrates two neighboring new radio (NR) cells of an example communication system in which embodiments of the present disclosure could be implemented.

As illustrated in FIG. 2, NR cells 282, 284 each includes multiple TRPs that are assigned a same NR cell ID. For example, NR cell 282 includes TRPs 286, 287, 288, 289, 290, and 292, where TRPs 290, 292 communicates with an ED, such as UE 294. It is obviously understood that other TRPs in NR cell 282 may communicate with UE 294. NR cell 284 includes TRPs 270, 272, 274, 276, 278, and 280. TRP 296 is assigned to NR cells 282, 284 at different times, frequencies or spatial directions and the system may switch the NR cell ID for transmit point 296 between the two NR cells 282 and 284. It is contemplated that any number (including zero) of shared TRPs between NR cells may be implemented in the system.

In one embodiment, the system dynamically updates the NR cell topology to adapt to changes in network topology, load distribution, and/or UE distribution. In some implementations, if the concentration of UEs increases in one region, the system may dynamically expand the NR cell to include TRPs near the higher concentration of UEs. For example, the system may expand an NR cell to include other TRPs if the concentration of UEs located at the edge of the NR cell increases above a certain threshold. As another example, the system may expand an NR cell to include a greater concentration of UEs located between two hyper cells. In some implementations, if the traffic load increases significantly at one region, the system may also expand the NR cell associated with the region to include TRPs for the increased traffic load. For example, if the traffic load of a portion of the network exceeds a predetermined threshold, the system may change the NR cell ID of one or more TRPs that are transmitting to the impacted portion of the network.

In another embodiment, the system may change the NR cell ID associated with TRP 296 from the NR cell ID of NR cell 282 to the NR cell ID of NR cell 284. In one implementation, the system can change the association of a TRP with different NR cells periodically, such as every 1 millisecond. With such a flexible NR cell formation mechanism, all UEs can be served by the best TRPs so that there are substantially no cell edge UEs.

In yet another embodiment, the shared TRP 296 can reduce interference for UEs located at the boundary between the two NR cells 282, 284. UEs that are located near the boundaries of two NR cells 282, 284 experience less handovers because the shared TRP is associated with either NR cell at different times, frequencies or spatial directions. Further, as a UE moves between the NR cells 282, 284, the transition is a smoother experience for the user. In one embodiment, the network changes the NR cell ID of the TRP 296 to transition a UE moving between NR cells 282, 284.

The system may apply TRP selection techniques to minimize intra-NR cell interference and inter-NR cell interference. In one embodiment, a TRP sends a downlink channel state information (CSI)-reference symbol (RS). Some pilot (also known as reference signal) ports may be defined such that the UEs can measure the channel state information and report it back to the network. A CSI-RS port is a pilot port defined as a set of known symbols from a sequence transmitted over known resource elements (for example OFDM resource elements) for UEs to measure the channel state. A UE assigned to measure a particular CSI-RS port can measure the transmitted CSI-RS sequence, measure the associated channel state and report it back to the network. The network, such as a controller, may select the best TRPs for all served UEs based on the downlink measurements. In another embodiment, a TRP detects an uplink sounding reference signal (SRS) sequence from a UE in the configured time-frequency resources. For example, Constant Amplitude Zero Auto Correlation (CAZAC) sequences such as Zadoff-Chu (ZC) sequences can be used as base sequences for SRS. The TRP reports a measurement of the detected uplink SRS sequence to the network, such as the controller. The controller then selects the optimal TRPs for all served UEs based on the measurements.

Figure 3A:
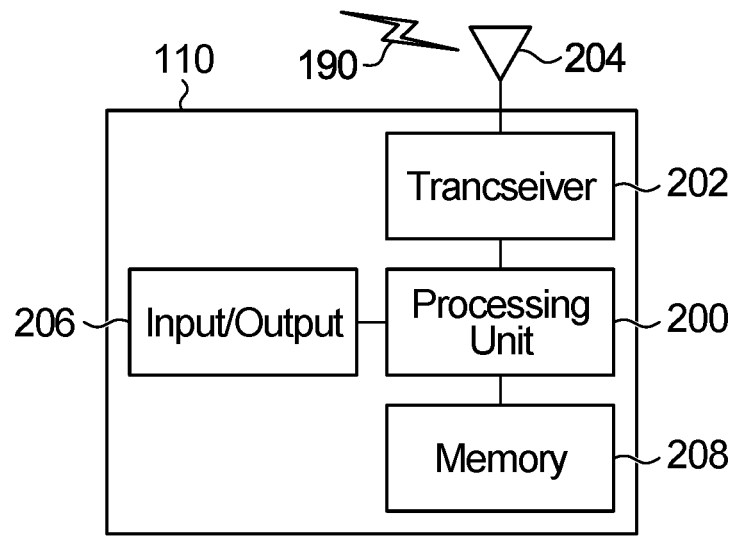
FIGS. 3A and 3B are block diagrams of an example electronic device (ED) and base station, respectively, that may implement the methods and teachings according to this disclosure.
Figure 3B:
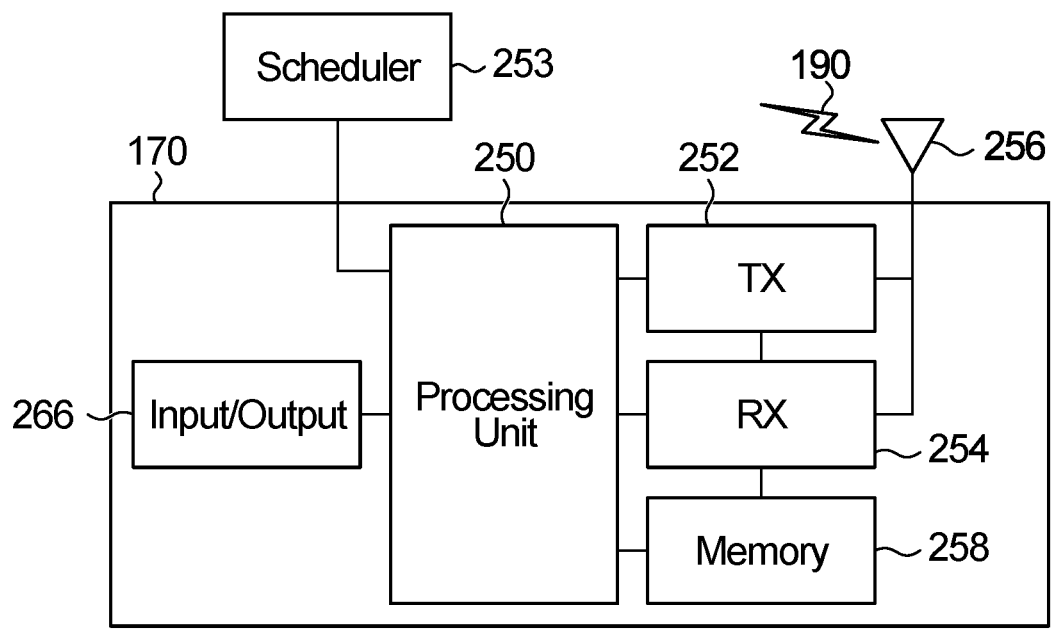

FIGS. 3A and 3B illustrate example devices that may implement the methods and teachings according to this disclosure. In particular, FIG. 3A illustrates an example ED 110, and FIG. 3B illustrates an example base station 170. These components could be used in the system 100 or in any other suitable system.

As shown in FIG. 3A, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 may also be configured to implement some or all of the functionality and/or embodiments described in more detail above. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or Network Interface Controller (NIC) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110. One or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described above and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 3B, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the functionality and/or embodiments described above and that are executed by the processing unit(s) 250.

Each input/output device 266 permits interaction with a user or other devices in the network. Each input/output device 266 includes any suitable structure for providing information to or receiving/providing information from a user, including network interface communications.

Below are provided several solutions to the first problem described above pertaining to the difference in latency between the serving cell/gNB sending a command to the UE for switching to a new active UL BWP and the UE initiating the command and the serving cell/gNB sending a notification to the neighboring cell/gNB that the command has been sent to the UE and the neighboring cell/gNB has an opportunity to reconfigure so the neighboring cell/gNB can receive SRS on a new BWP.

Although the following problems and solutions generally describe a serving cell/gNB communicating with a single neighboring cell/gNB and a UE transmitted SRS being measured at a single neighboring cell/gNB, it is to be known that there may be multiple neighboring cells/gNBs that are communicating with the serving cell and receiving SRS from the UE in order to determine the position of the UE or perform UL-based mobility procedure. Furthermore, multiple UEs being served by the serving cell/gNB may be communicating with the serving cell/gNB and their SRS may be received and measured by one or more neighboring cells/gNBs. Different neighboring cells/gNBs and a different number of neighboring cells/gNBs can be receiving SRS from different UEs.

A first solution involves the neighboring cell/gNB performing blind detection on multiple BWPs, one of which should include SRS from the UE. The serving cell/gNB configures the UE with multiple UL BWPs. A particular example may be up to 4 UL BWPs. One or multiple SRS resource sets may be configured in each of these UL BWPs or, in other words, be associated with each of these configured UL BWPs. If a SRS is associated with an UL BWP, the SRS BW is confined within the BW of that BWP. The serving cell sends to the UE the UL BWP configurations as well as the configuration of the SRSs associated with each UL BWP. In some embodiments, the SRS configuration information may include configuration information included in the "SRS_Config" information element, for example as defined in 38.331. The SRS configuration information sent to the UE includes information necessary for the UE to be able to transmit the SRS, such as, but not limited to, SRS sequence information, resource mapping information, transmit power information, periodicity and spatial transmission information. The serving cell also notifies the UE in DCI which of the configured UL BWPs is active. Note that only one of the configured UL BWPs is active at a time and hence only the SRSs associated with that active UL BWP may be actually transmitted. The serving cell also sends to the neighboring cell/gNB the UL BWP configurations of the UE as well as the configuration of the SRS resource sets associated with each UL BWP. This information also enables the neighboring cell/gNB to detect the transmitted SRS in the active UL BWP if the neighboring cell/gNB knows which UL BWP is active. Note that the information regarding the configuration of SRSs and BWPs that is available at the neighboring cell/gNB may not be exactly the same as the information regarding the configuration of SRSs and BWPs that is available at the UE. For instance, the information regarding a frequency A or time B that is necessary to detect SRS is indicated to the neighboring cell/gNB in reference to a reference frequency C or reference time D where C and D are known to the neighboring cell/gNB while the information regarding the frequency A or time B that is necessary to transmit SRS is indicated to the UE in reference to a reference frequency E or reference time F where E and F are known to the UE. Also, an information element (parameter or field) G that is necessary to transmit SRS may be indicated to the UE but the information element (parameter or field) G may not be indicated to the neighboring cell/gNB because it is either known implicitly at the neighboring cell/gNB, or can be derived at the neighboring cell/gNB from another available parameter, or its knowledge at the neighboring cell/gNB may not be necessary to detect SRS.

As discussed above, the serving cell notifies the UE in DCI which UL BWP should be active or when the active UL BWP should be switched. However, the neighboring cell/gNB does not know any information about the current active UL BWP. This may be due to the fact that the serving cell does not share the information regarding the current active UL BWP with the neighboring cell/gNB or due to the fact that the latency of communicating this information to the neighboring cell/gNB is far larger than the latency of communicating this information to the UE in DCI. In effect, the neighboring cell/gNB knows the UL BWP configurations and the configurations of the associated SRSs with each of the UL BWPs, but does not know which of the configured BWPs is active at each given time and, hence, does not know, which of the configured SRSs are actually transmitted.

In a particular example, after the configuration information has been sent to the UE and the neighboring cell/gNB, a UE receives a command from the serving cell/gNB to switch the active UL BWP which implies switching all UL transmissions including the transmission of the SRS from a first UL BWP to a second UL BWP. The UE proceeds to switch UL BWPs. Since the neighboring cell has received the configuration information defining at least the possible BWPs that could be used for SRS transmission, the neighboring cell then detects the transmitted SRS by performing blind detection on all configured UL BWPs.

The serving cell/gNB can notify the neighboring cell of the UL BWP configurations and the associated SRS configuration information in each configured UL BWP directly or through a location management function (LMF).

In this example, the latency issue is resolved at the cost of complexity at the network side as the network has to perform blind detection for up to the maximum number of configured BWPs, but at least until the correct SRS is found.

Figure 4A:
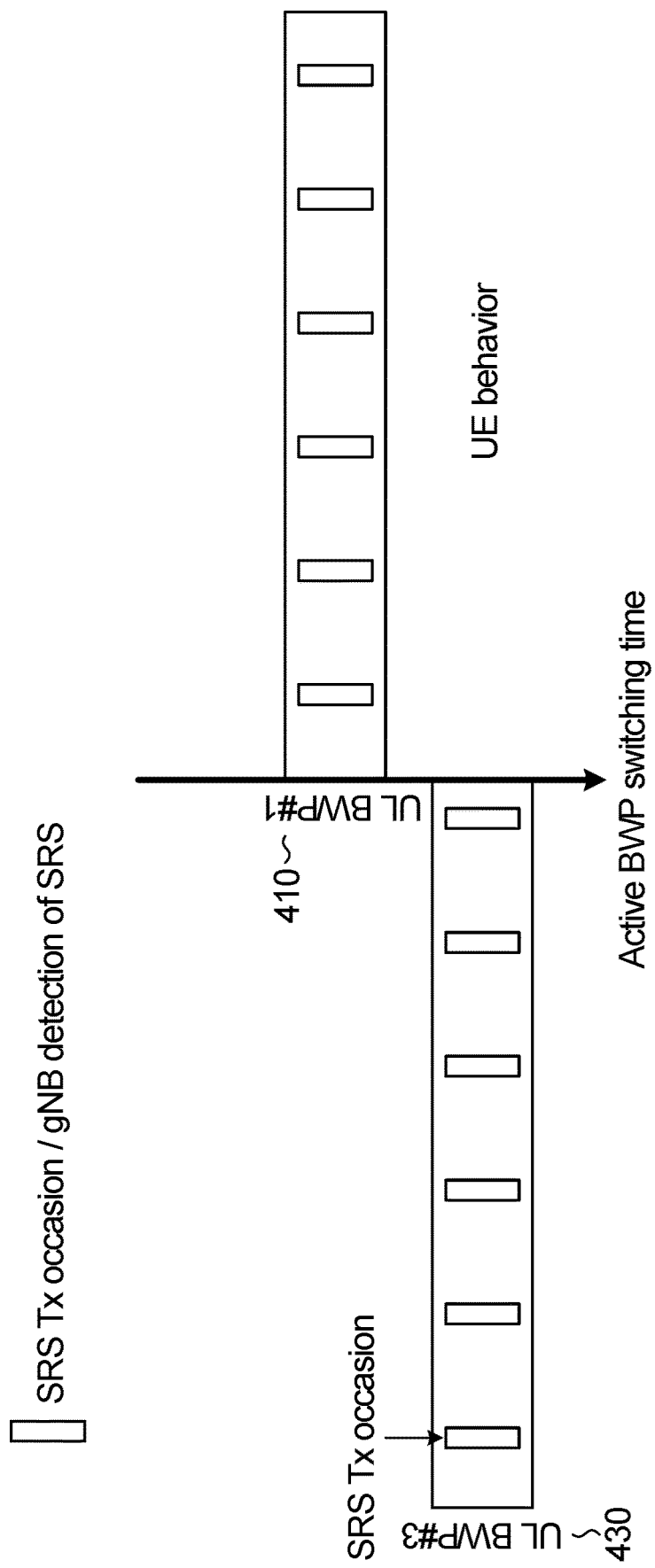
FIGS. 4A and 4B are examples of transmission of SRS by a UE and neighboring cell/gNB performing monitoring and blind detection on multiple bandwidth parts (BWPs) to detect the SRS transmitted by the UE in one BWP in accordance with an embodiment of the present application.
Figure 4B:
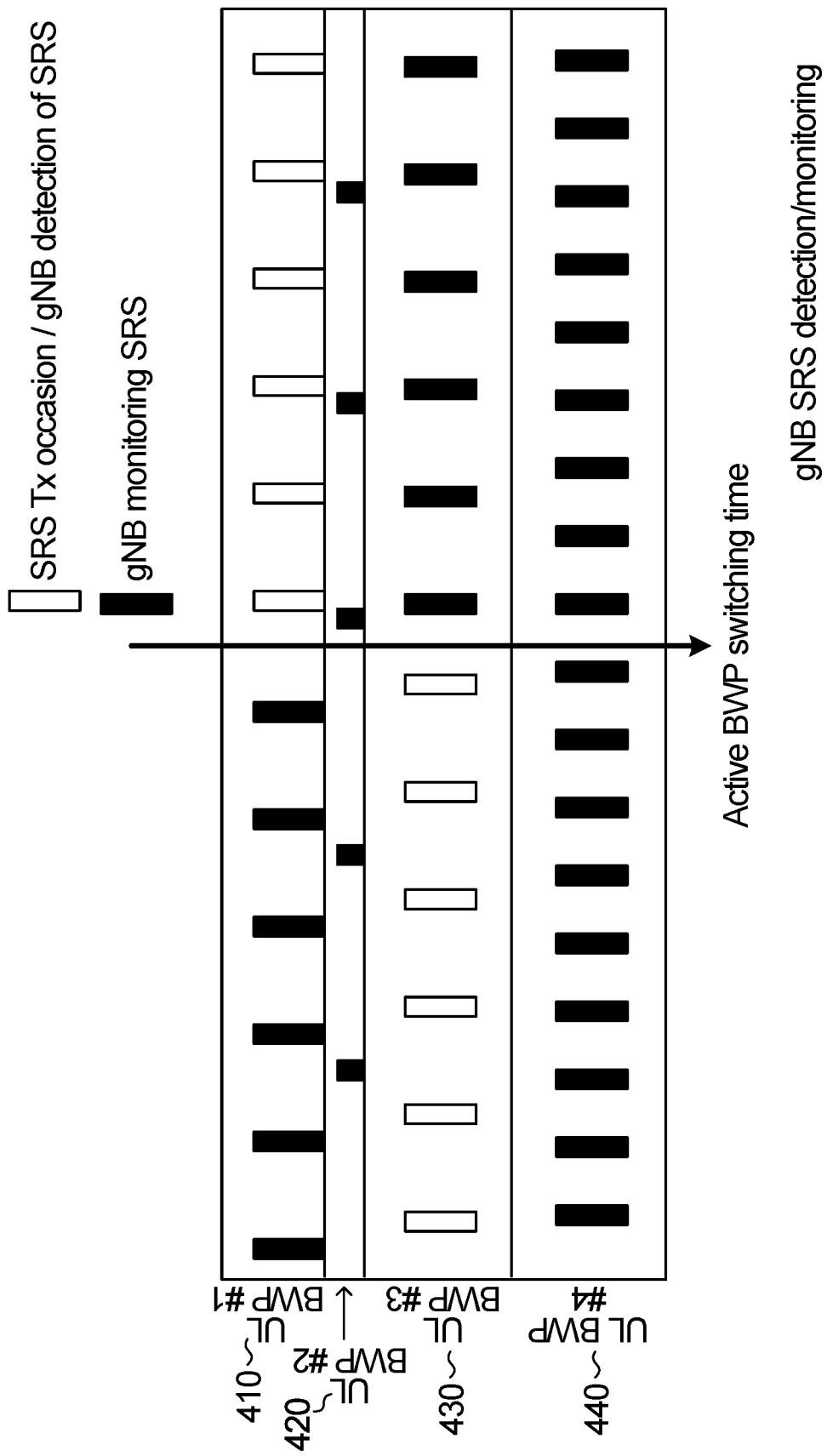

FIG. 4A shows an example of SRS being transmitted periodically or semi-persistently in a UL BWP #3 430 by a UE and then the UE switching the SRS to a UL BWP #1 410. The horizontal axis is increasing in time and the vertical axis is representative of frequency. FIG. 4B shows an example of the neighboring cell/gNB behavior over a similar time period. The neighboring cell has been notified of the configured UL BWPs of the UE (four BWPs in this example UL BWP #1 410, UL BWP #2 420, UL BWP #3 430 and UL BWP #4 440) which could be potentially used by the UE for the SRS transmission. The actually transmitted SRS can be seen on UL BWP #3 430 until the SRS is switched to UL BWP #1 410. The neighboring cell/gNB however needs to monitor all configured UL BWPs and determine whether or not the configured SRS that is associated with that BWP is actually transmitted. In FIG. 4B, the SRS is only transmitted in UL BWP #3 430 before active UL BWP switching while the neighboring cell/gNB monitors all four configured UL BWPs, UL BWP #1 410, UL BWP #2 420, UL BWP #3 430 and UL BWP #4 440, to determine whether or not SRS is transmitted in each of them. Similarly, in FIG. 4B, the SRS is only transmitted in UL BWP #1 410 after active UL BWP switching while the neighboring cell/gNB monitors all four configured UL BWPs, UL BWP #1 410, UL BWP #2 420, UL BWP #3 430 and UL BWP #4 440, to determine whether or not SRS is transmitted in each of them.

Figure 4C:
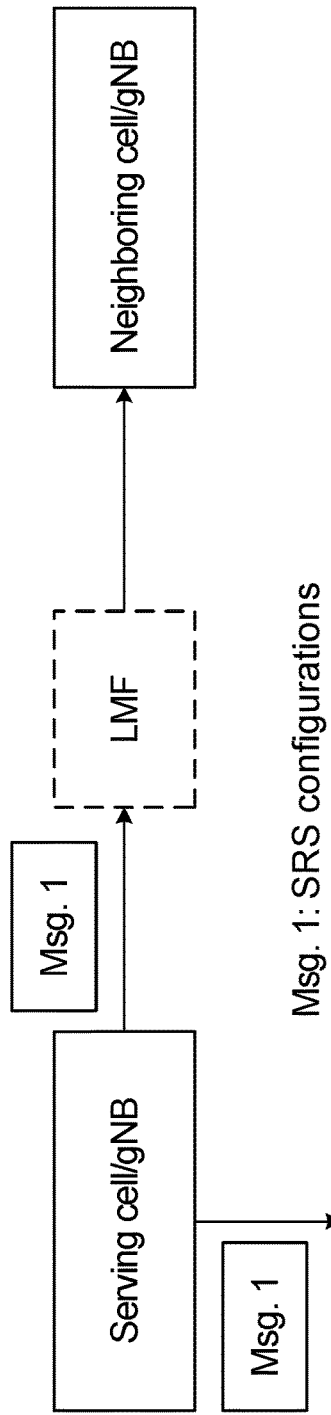
FIG. 4C is a schematic diagram of an example of transmissions between a serving cell/gNB, a UE and a neighboring cell/gNB to implement transmissions as shown in FIGS. 4A and 4B in accordance with an embodiment of the present application.

FIG. 4C is a schematic diagram of an example message flow between the various telecommunications components involved. The serving cell (Serving cell/gNB) transmits a message (Msg. 1) including SRS configuration to UE. The Serving cell/gNB also transmits a message (Msg. 1) including SRS configuration to the neighboring cell (Neighboring cell/gNB). The contents of the two messages may not include all the same configuration information. An LMF is shown in a dashed block between the Serving cell/gNB and the Neighboring cell/gNB indicating that the LMF may occur in some embodiments, but not others.

Direct inter-gNB/inter-cell communication between the serving cell and neighboring cell using XnAP or indirect communication between gNBs/cells via the LMF using NR PPa is usually bi-directional and explained in 38.455 for NR LPPa and 38.423 for XnAP.

Figure 4D:
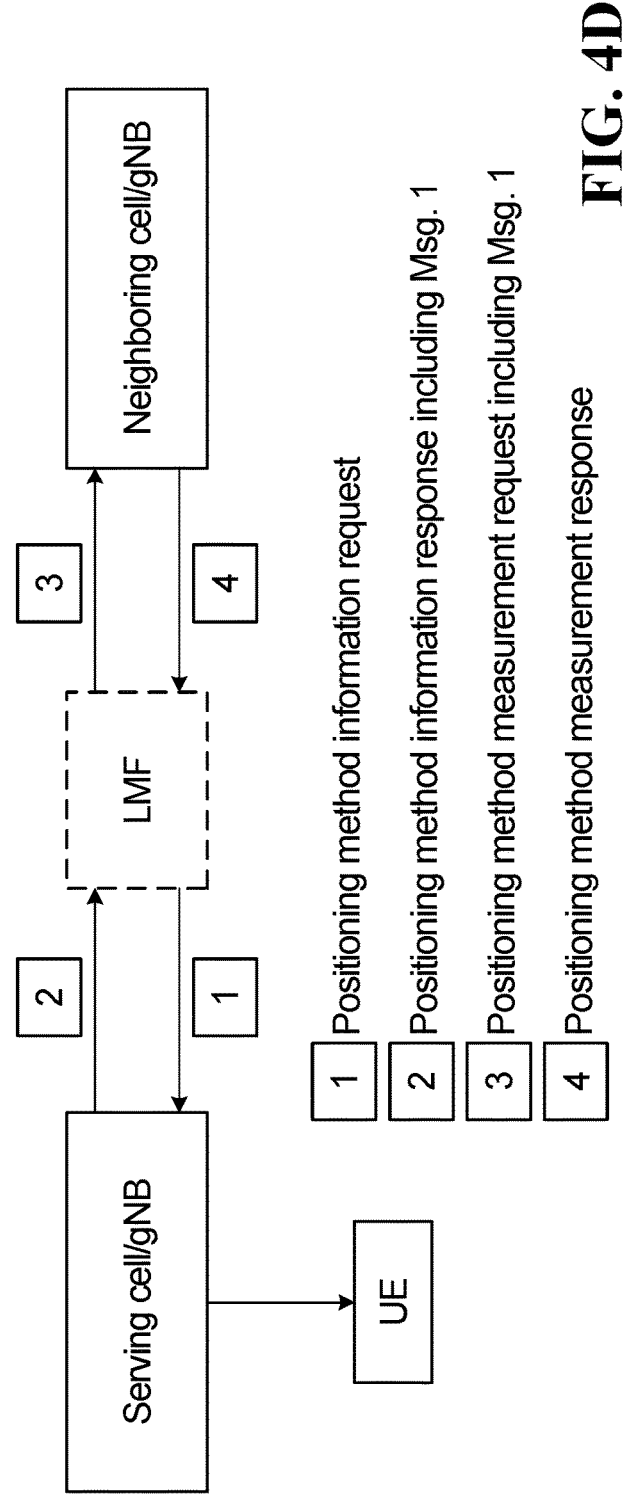
FIG. 4D is a more detailed schematic diagram of an example of transmissions shown in FIG. 4C.

FIG. 4D includes an example of message flows described in greater detail between the Serving cell/gNB and the LMF and the LMF and a Neighboring cell/gNB. A first message 1 occurs between the LMF and the Serving cell/gNB and consists of a positioning method information request. A second message 2 occurs between the Serving cell/gNB and the LMF and consists of a positioning method information response including configuration information. The configuration information will include SRS configuration information, at least some of which has been sent to the UE. A third message 3 occurs between the LMF and the Neighboring cell/gNB and consists of a positioning method measurement request including the configuration information received in the positioning method information response message 2. A fourth message 4 occurs between the Neighboring cell/gNB and the LMF and consists of a positioning method measurement response including the measurements made by the Neighboring cell/gNB on the SRS transmitted by the UE being served by the serving cell. The information in the fourth message includes information that can then be used to determine the position of the UE in combination with measurement information from other cells/gNBs/NR LMUs and/or TMFs.

A second solution involves the UE transmitting the SRS on a first UL BWP for a period of time after a BWP switching command has been received or after the BWP switching timer is expired (for timer-based active BWP switching) and other scheduled or configured UL transmission have been switched from the first UL BWP to a second UL BWP. Alternatively, the UE may transmit the SRS on a first UL BWP for a period of time after a new (second) UL BWP has been activated and other scheduled or configured UL transmissions have been switched from the first UL BWP to a second UL BWP. In this manner the UE continues to transmit the SRS where the neighboring cell/gNB expects it to be, until the SRS transmission is deactivated in the first BWP. The SRS transmission can then be activated in the second BWP. This allows the neighboring cell/gNB to receive a notification of the BWP switching and reconfigure itself to start receiving the SRS on the second BWP when it is activated.

The serving cell transmits configuration information to the UE and neighboring cell/gNB. The configuration information includes information for the UE to define the transmission resource to be used by the UE for transmitting the SRS. This information enables the UE to transmit the SRS and the neighboring cell/gNB to know the transmission resource being used by the UE. The SRS configuration information transmitted to the UE and the neighboring cell/gNB may not be exactly the same.

After the serving cell transmits an active BWP switching command to transmit UL transmission other than the SRS to switch from a first UL BWP to a second UL BWP, the UE keeps transmitting SRS in the first UL BWP until it is de-activated. The SRS transmission in the first UL BWP can be explicitly de-activated or implicitly de-activated. Some examples of how implicit deactivation may occur includes: SRS deactivation in the first UL BWP occurs when the UE receives location information, which may include the determined position of the UE; SRS deactivation in the first UL BWP occurs when the UE receives a location information acknowledgement; SRS deactivation in the first BWP occurs when the UE receives an activation command for SRS in the second BWP; SRS deactivation in the first BWP occurs after a delay period; and SRS deactivation in the first BWP occurs after a timer in the UE expires.

When SRS deactivation in the first BWP occurs after a delay period, the delay period may be configured by the serving cell sending a radio resource control (RRC) message to the UE, may be indicated in DCI, or may be configured based on a known value from an accepted telecommunication standard. In some embodiments, for example in the case of DCI-based BWP switching, the delay period starts from the slot where the UE receives the BWP switching DCI. In some embodiments, for example in the case of timer-based switching, the delay period starts from the slot during which a BWP switching timer expires.

The deactivation command may include information to deactivate the SRS transmission after: X transmission occasions or after Y transmission occasions that occur after a UL BWP switching time or after Z milliseconds after the UL BWP switching time. Also, the deactivation command to deactivate the SRS may be issued by the serving cell/gNB to the UE after the serving cell/gNB is notified directly, or through the LMF, that the neighboring cell/gNB has performed its measurement on the SRS; when the LMF notifies the serving cell/gNB that the UE positioning procedure is complete; or when the LMF notifies the serving cell/gNB that there is no need to further transmit SRS; or when LMF notifies the serving cell/gNB about the UE position.

The activation of the SRS in the second UL BWP can occur based on an explicit activation command or an activation command can be determined implicitly. SRS activation may occur in the second BWP when the UE receives an implicit or explicit deactivation command for SRS in the first BWP.

Depending on UE capability, for example if both SRS and other scheduled or configured UL transmissions cannot be transmitted on different BWPs at the same time, a gap may need to be configured to allow transmission of the SRS on the first BWP while interrupting other scheduled or configured UL transmissions in the second BWP. Alternatively, some SRS transmission occasions may be interrupted on the first BWP to allow other UL transmissions on the second BWP at a given time.

When the priority of SRS transmission is higher than the priority of other scheduled or configured UL transmissions, which may include PUSCH and PUCCH, a gap may be used to interrupt the transmission of other scheduled or configured UL transmissions to transmit the SRS. When the gap is used, it may be defined by a repetition period and a gap length. The gap repetition period is equal to the periodicity of the configured SRS. The gap length is equal to the length of the SRS resources plus X symbols before and after the SRS resource transmission occasion, where X is an integer number. The gap may also be defined by a reference point in time. This reference point may be, for example, the center of the gap. In some embodiments, the center of the gap occasion in time can coincide with the center of the SRS resource transmission occasion.

In some embodiments, the gap activation (i.e. the start time) occurs with respect to the time that a gap command is received by the UE. For example, the UE applies a gap on the first SRS transmission occasion that occurs Y slots after the gap command is received by the UE, where Y is an integer number. In some embodiments, the gap activation occurs as an absolute time or a time with respect to the first SRS transmission occasion.

Some or all of the above gap-related parameters may be pre-configured based on industry standard specifications or may be a part of the gap configuration information provided to the UE.

In some embodiments, gap configuration parameters may be standardized and be known to the UE and thus would not need to be provided to the UE in a message sent by the serving cell.

Alternatively, and depending on the UE capability, when the priority of the SRS transmission is lower than the priority of other UL channels/signals, the SRS transmission is interrupted to transmit those UL channels/signals in the active UL BWP.

Figure 5:
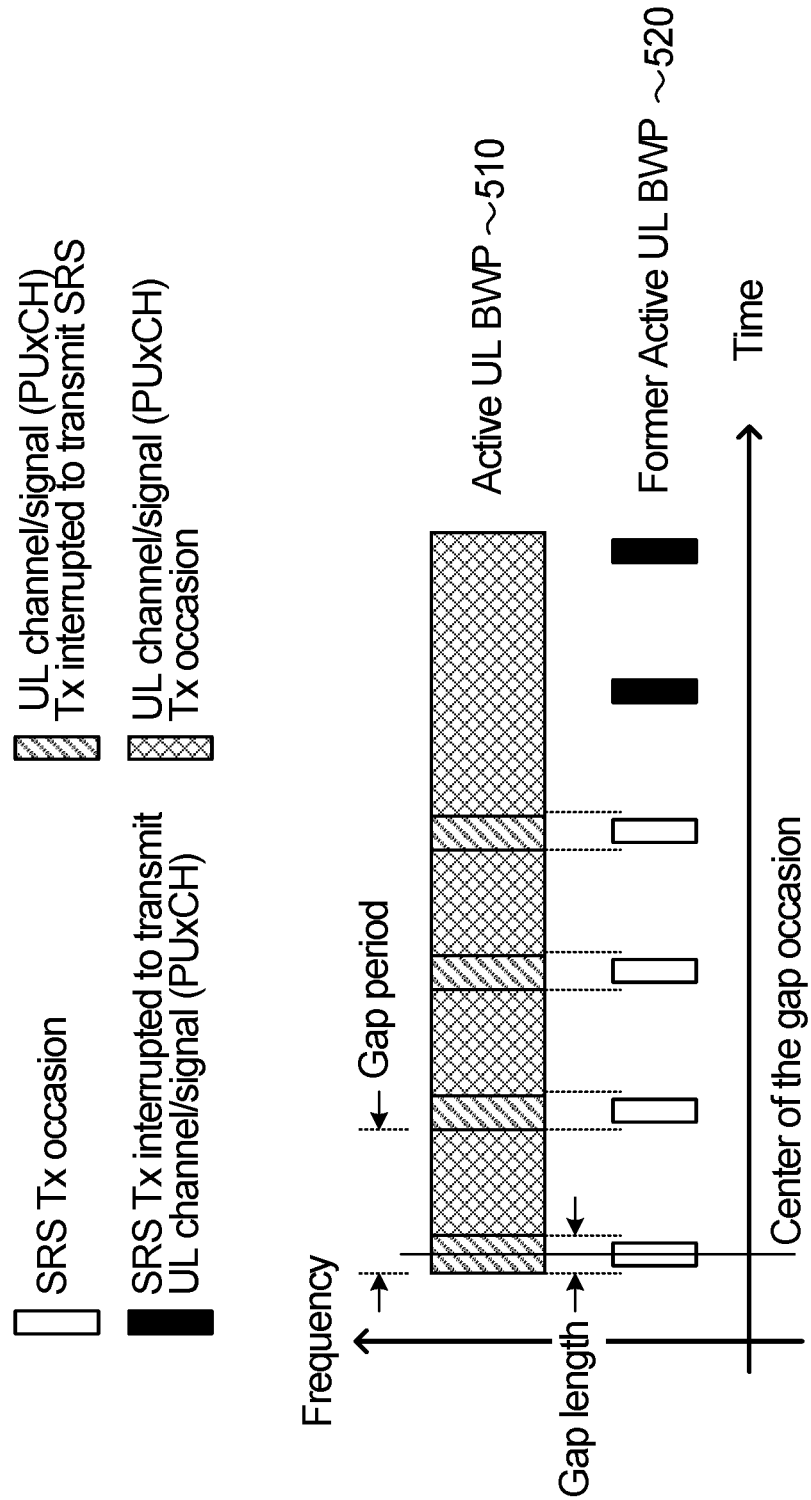
FIG. 5 is an example of allowing interruption in SRS transmission and a gap in other UL transmissions in accordance with an embodiment of the present application.

FIG. 5 illustrates an example of two BWPs, an active UL BWP 510 that includes scheduled and configured UL transmissions and an UL BWP that was a former active UL BWP 520 on which SRS for positioning in still being transmitted. In the active UL BWP 510, four gap occasions are created to allow higher priority SRS transmissions on the former active UL BWP 520. After the four higher priority SRS transmissions are transmitted on the former active UL BWP 520, two SRS transmission occasions are interrupted in the former active UL BWP 520 to allow higher priority transmissions on the active UL BWP 510. The gap length, gap period and center of the gap are identified in the figure.

The serving cell can notify the neighboring cell/gNB of the SRS configuration information and optionally the deactivation command directly or through a location management function (LMF).

Figure 6A:
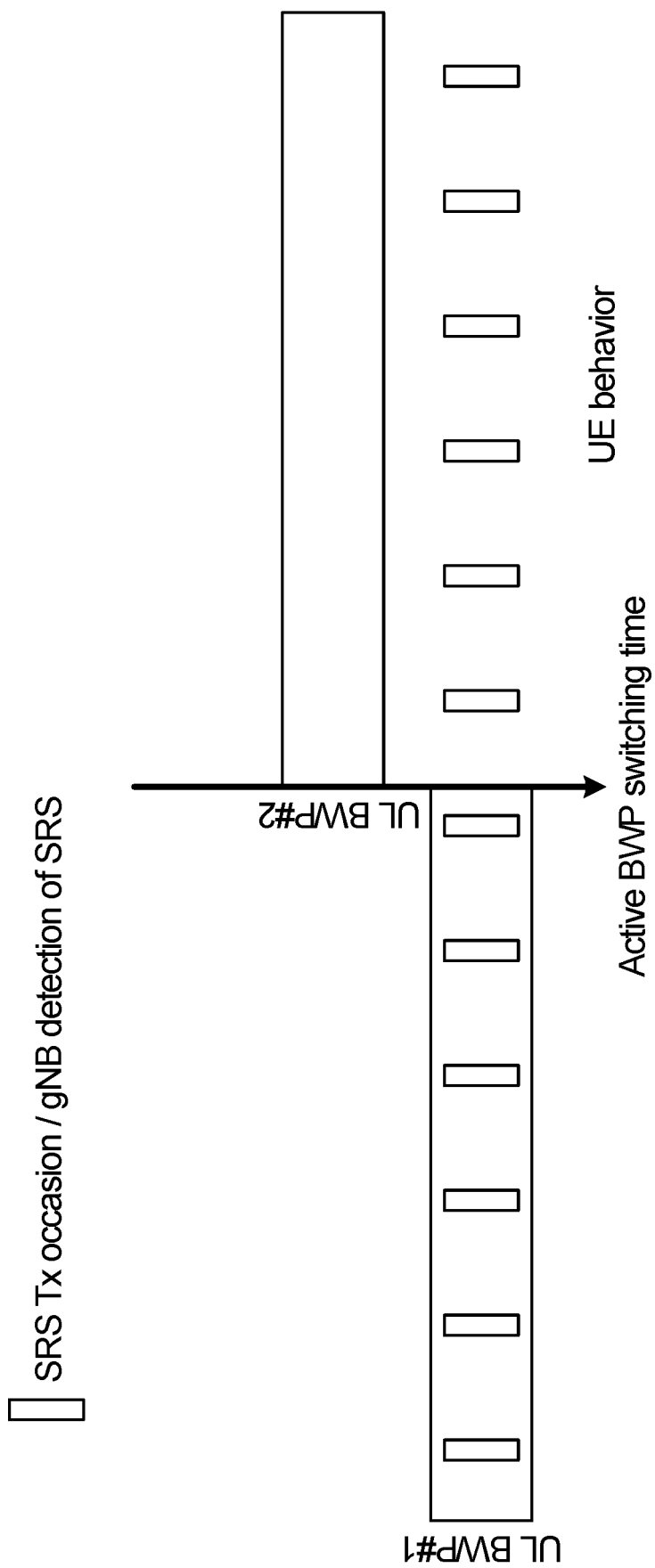
FIG. 6A is an example of transmission of SRS by a UE on a first BWP after a switching BWP command has caused other UL transmissions to be switched to a second BWP in accordance with an embodiment of the present application.

FIG. 6A shows an example of SRS being transmitted periodically or semi-persistently in a first UL BWP (UL BWP #1) by a UE and then after a command to switch other scheduled or configured UL transmissions to a second UL BWP (UL BWP #2) has been received and initiated, the UE continues to transmit the SRS on the first UL BWP for a period of time. The horizontal axis is increasing in time and the vertical axis is representative of frequency.

Figure 6B:
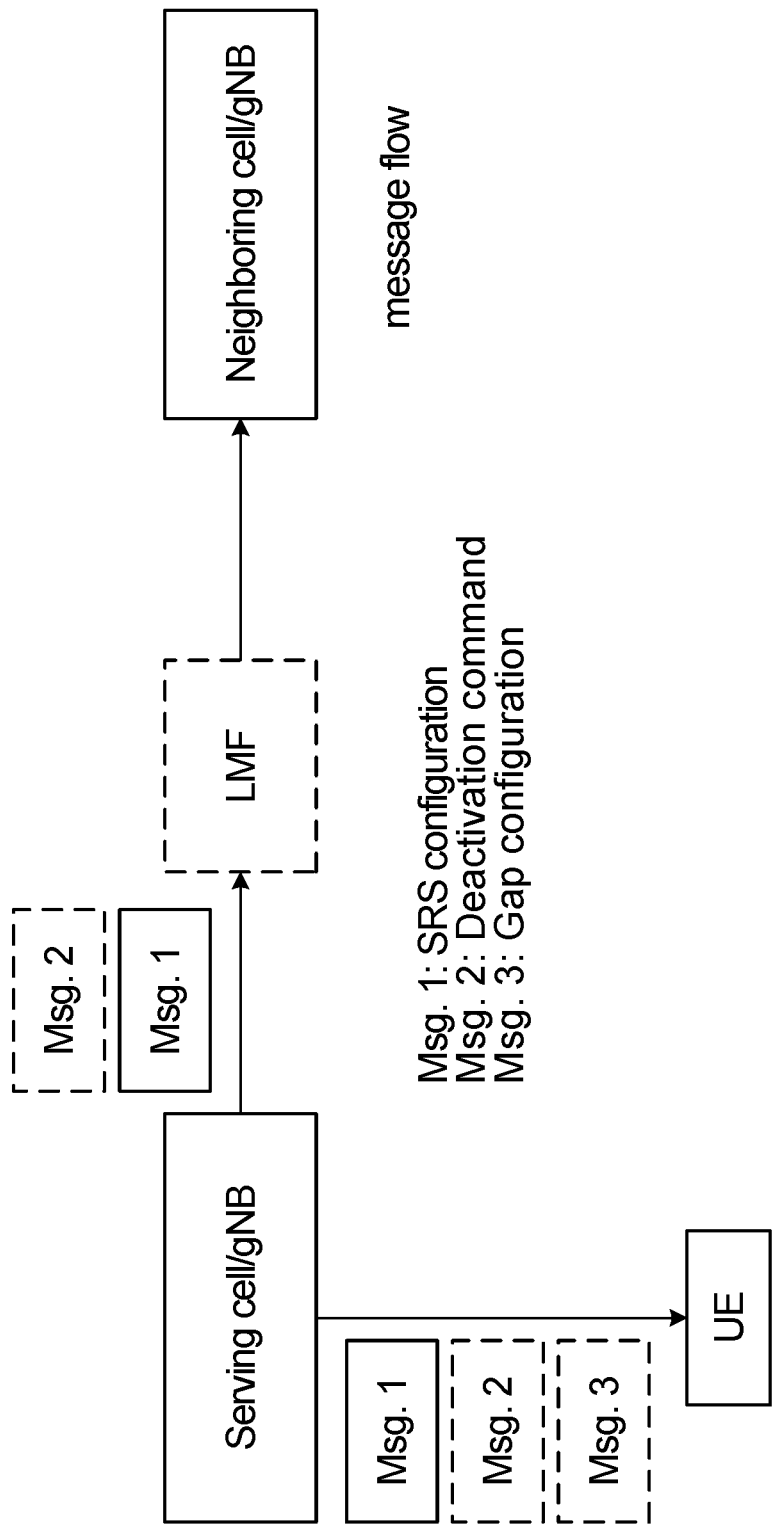
FIG. 6B is a schematic diagram of an example of transmissions between a serving cell/gNB, a UE and a neighboring cell/gNB to implement transmissions as shown in FIG. 6A in accordance with an embodiment of the present application.

FIG. 6B is a schematic diagram of an example message flow between the various telecommunication components involved. The Serving cell/gNB transmits a message (Msg. 1) including SRS configuration to UE. The Serving cell/gNB may also transmit a deactivation command (Msg. 2) at a certain point to deactivate the SRS from being transmitted on the first BWP. The Serving cell/gNB may also transmit gap configuration information (Msg. 3) as described above. The Serving cell/gNB also transmits a message (Msg. 1) including SRS configuration to the neighboring cell (Neighboring cell/gNB). The SRS configuration may not be exactly the same configuration information sent to the UE. The Serving cell/gNB may also transmit the deactivation command (Msg. 2) to the Neighboring cell/gNB. An LMF is shown in a dashed block between the Serving cell/gNB and the Neighboring cell/gNB indicating that the LMF may occur in some embodiments, but not others.

A third solution involves the UE transmitting the SRS on a first UL BWP for a period of time after a BWP switching command has been received and other scheduled or configured UL transmissions have been switched from the first UL BWP to a second UL BWP in a similar manner to the second solution. However, in this case the UE deactivates the SRS transmission on the first UL BWP after a configured delay period ($D_{SRS}$). In this manner the UE continues to transmit the SRS where the neighboring cell/gNB expects it to be, until the SRS transmission is deactivated in the first UL BWP at the end of the delay period. The SRS transmission is then activated in the second UL BWP. This allows the neighboring cell/gNB to receive a notification of the BWP switching and configure itself to receive the SRS on the second BWP.

The serving cell transmits configuration information to the UE and neighboring cell. The configuration information includes information for the UE to define the transmission resource to be used by the UE for transmitting the SRS. This information enables the UE to transmit the SRS and the neighboring cell/gNB to know the transmission resource being used by the UE.

The UE keeps transmitting SRS in the first UL BWP, after the UL BWP switch, until the SRS transmission is deactivated based on the expiry of the delay period. The delay period should be long enough so that the UL BWP switching command, or an SRS switching command that is triggered by the UL BWP switch, has been received at the neighbor cell/gNB using backhaul (i.e. using XnAP or NR PPa protocols). The delay may be in the form of a timer which is triggered implicitly by receiving a BWP switching DCI or when a BWP switching timer expires. The SRS transmission switching time is implicitly or explicitly known to the UE. The delay period may be configured by higher layer signaling, be indicated in DCI, or be known by the UE and network from an accepted telecommunication standard.

In some embodiments, the SRS transmission may be switched to the second UL BWP after receiving a SRS switching command. The SRS switching command is a command that defines the delay period for switching the SRS from the first UL BWP to the second UL BWP. A message including the SRS switching command may be sent by the serving cell to both the UE and directly, or via the LMF, to the neighboring cell/gNB. Although the message determines the time that the SRS switches to the second UL BWP (at a point in time equal to the delay period after other UL transmissions are switched to the second UL BWP switch), the manner in which the message is provided to the UE and the neighboring cell/gNB may be different. For instance, the message to the UE may indicate the delay period in terms of a time in reference to the BWP switching time or a time in reference to a time that a BWP switching timer expires. However, the neighboring cell/gNB may not be aware of the reference time and the delay period is provided to the neighboring cell/gNB in reference to an absolute time or a slot frame number (SFN) and a slot number or a SFN initialization time. In some embodiments, the delay period may be known to the UE, based on being an agreed upon value from a telecommunication standard, and does not need to be sent to the UE.

Similar to the second solution, a gap may be used depending on the UE capability for each SRS transmission occasion during the delay period or some SRS transmission occasions may be interrupted to transmit other scheduled or configured UL channels/signals in the current UL BWP during the delay period.

In some embodiments, there may be an additional time gap between the time that the SRS transmission is deactivated in the first UL BWP and then activated in the second UL BWP.

The serving cell/gNB can notify the neighboring cell/gNB of the SRS configuration information and optionally the deactivation command directly or through a location management function (LMF).

Figure 7A:
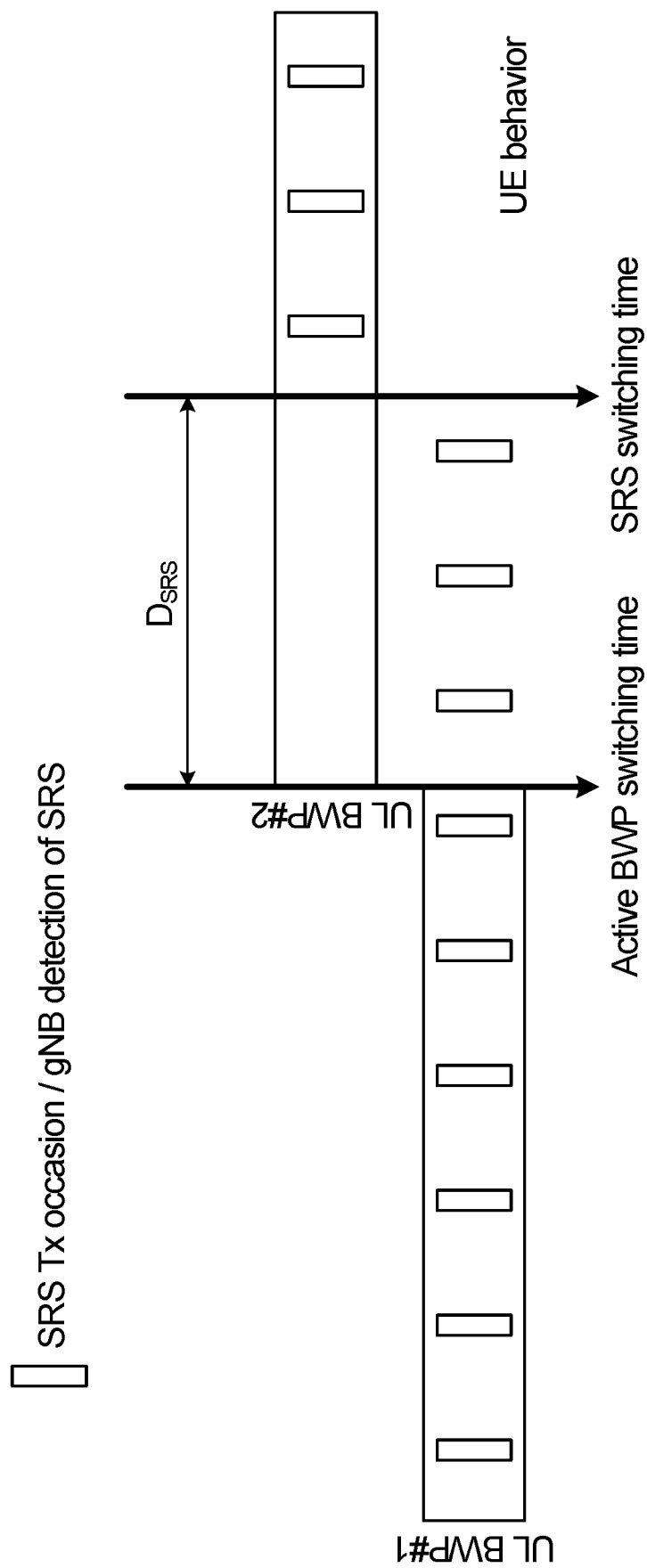
FIG. 7A is an example of transmission of SRS by a UE on a first BWP for a particular delay period after a switching BWP command has caused other UL transmissions to be switched to a second BWP in accordance with an embodiment of the present application.

FIG. 7A shows an example of SRS being transmitted periodically or semi-persistently in a first UL BWP (UL BWP #1) by a UE and then after a command to switch other scheduled or configured UL transmissions from a first UL BWP to a second UL BWP (UL BWP #2) has been received and initiated or after a BWP switching timer is expired, the UE continues to transmit the SRS on the first UL BWP for a defined delay period. The horizontal axis is increasing in time and the vertical axis is representative of frequency.

Figure 7B:
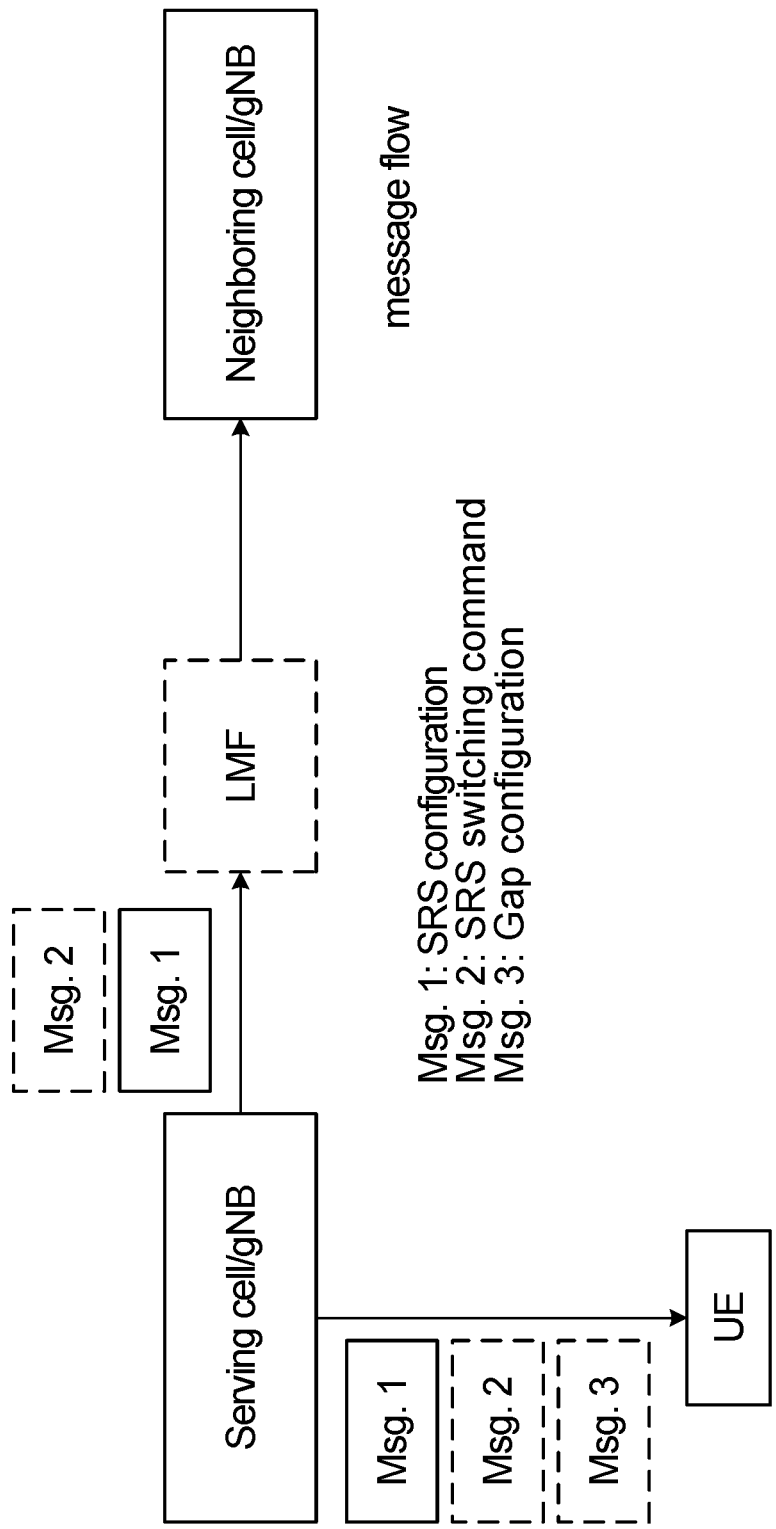
FIG. 7B is a schematic diagram of an example of transmissions between a serving cell/gNB, a UE and a neighboring cell/gNB to implement transmissions as shown in FIG. 7A in accordance with an embodiment of the present application.

FIG. 7B is a schematic diagram of an example message flow between the various telecommunication components involved. The Serving cell/gNB transmits a message (Msg. 1) including SRS configuration to UE. The Serving cell/gNB may also transmit an SRS switching command (Msg. 2) at a certain point to cause the SRS to be switched from the first UL BWP to a second UL BWP. The Serving cell/gNB may also transmit gap configuration information (Msg. 3) as described above. The Serving cell/gNB also transmits a message (Msg. 1) including SRS configuration to the Neighboring cell/gNB. The SRS configuration may not be exactly the same configuration information sent to the UE. The Serving cell/gNB may also transmit a command (Msg. 2) to the Neighboring cell/gNB to notify the Neighboring cell/gNB the time that the Neighboring cell/gNB should look for the SRS transmission in the new BWP. An LMF is shown in a dashed block between the Serving cell/gNB and the Neighboring cell/gNB indicating that the LMF may occur in some embodiments, but not others.

A fourth solution involves when the UE receives a command to switch the SRS used for position detection and other scheduled or configured UL transmissions from a first UL BWP to a second UL BWP, the SRS transmission is switched to the second UL BWP as soon as the UE can initiate the command, with no significant regard for the operation of the neighboring cell. The neighboring cell/gNB is provided SRS configuration information so it configures itself upon receipt of the SRS configuration and then upon receipt of a UL BWP switching command starts detecting the SRS on the new active BWP as soon as the neighboring cell/gNB is able.

The serving cell/gNB transmits configuration information to the UE and neighboring cell/gNB. The configuration information includes information for the UE to define the transmission resource to be used by the UE for transmitting the SRS. The SRS configuration information sent to the neighboring cell/gNB may not include all of the same configuration information as sent to the UE. This configuration information enables the UE to transmit the SRS and the neighboring cell/gNB to know the transmission resource being used by the UE to transmit the SRS. As opposed to the first solution described above in which the neighboring cell/gNB is provided with all the possible BWPs that the UE could be using for transmission of SRS, but without indicating which BWP is being used, in this solution the neighboring cell/gNB that has been selected for aiding in determining the UE position is provided with configuration information of the BWP being used for the SRS transmission. In this solution, the neighboring cell/gNB that has been selected for aiding in determining the UE position may also be provided with the configuration information of other BWPs however, in this case, the neighboring cell/gNB is further provided with the information regarding which BWP is active and carries the actually transmitted SRS.

The serving cell/gNB sends a message including an UL BWP switching command to the UE and the UE initiates switching of all UL transmissions, including the SRS, from the first UL BWP to the second UL BWP. The serving cell/gNB also sends to the neighboring cell/gNB a notification that the UL BWP switching message has been sent to the UE. In the case of UL BWP switching triggered by expiration of the BWP switching timer at the UE side, the serving cell/gNB notifies the neighboring cell/gNB of the timer expiry event. The neighboring cell/gNB does not need to perform blind detection, the neighboring cell/gNB simply performs detection on the second UL BWP once the neighboring cell/gNB is aware that the UE is switched to the second UL BWP. In the case of timer-based BWP switching, the second UL BWP is the default UL BWP of the UE.

The UL BWP switching command sent to the UE and neighboring cell/gNB notifies those nodes of the UL BWP switching time. Although the message sent by the serving cell/gNB defines the BWP switching time, the manner of indicating this to the UE and to the neighbor cell/gNB may be different. The message is sent to the UE through DCI. The UE then switches to the second UL BWP X slots after receiving the BWP switching command, where X is an integer value. However, the BWP switching command that is sent to the neighboring cell/gNB may be indicated differently. For instance, the time to switch may be with reference to an absolute time or a system frame number (SFN) and a slot number or a SFN initialization time or Y slots or Z milliseconds after receiving the BWP switching command at the neighboring cell/gNB, where Y and Z are integer values and generally different from X.

The serving cell/gNB can notify the neighboring cell/gNB of the SRS configuration information and the UL BWP switching command directly or through a LMF.

Figure 8A:
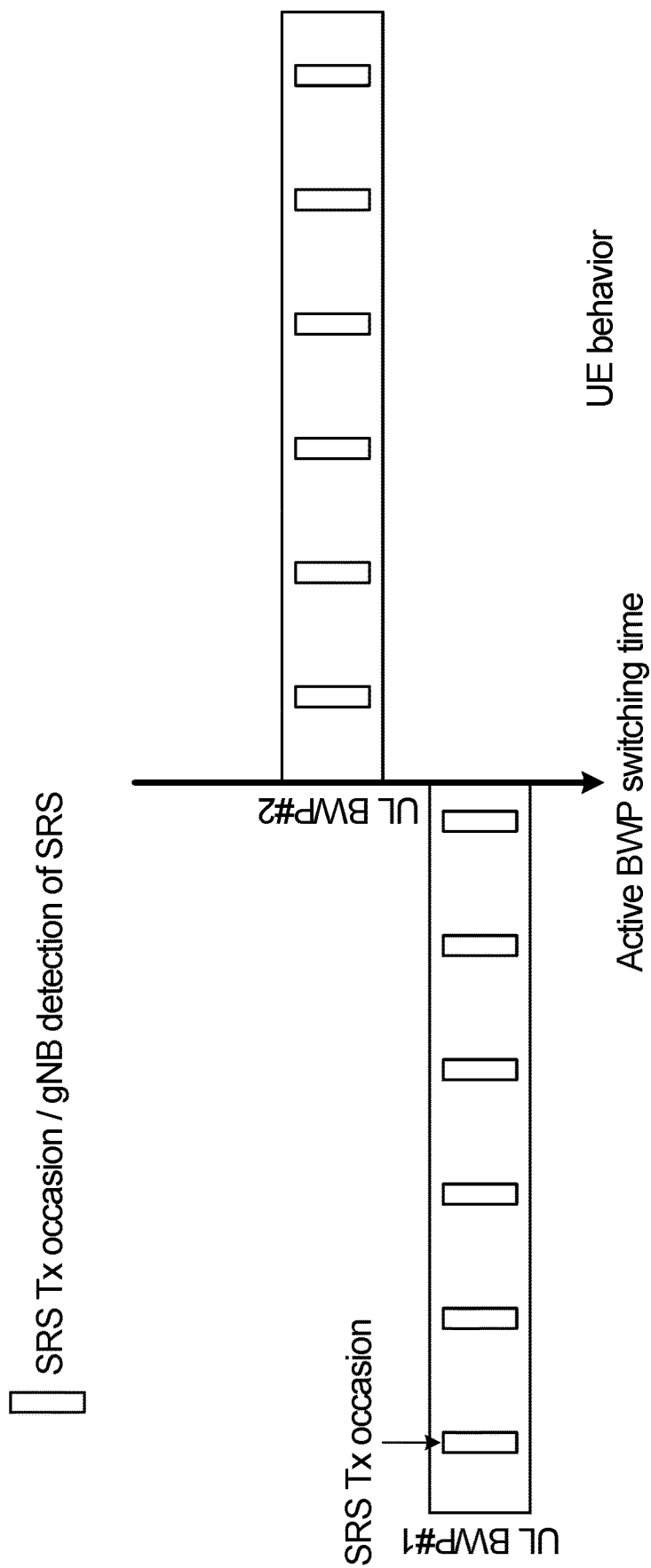
FIG. 8A is an example of transmission of SRS by a UE on a first BWP and then switching to a second BWP after the UE receives a switching BWP command to switch the SRS to the second BWP in accordance with an embodiment of the present application.

FIG. 8A shows an example of SRS being transmitted periodically or semi-persistently in a first UL BWP (UL BWP #1) by a UE and then the UE switching the SRS to a second BWP (UL BWP #2). The horizontal axis is increasing in time and the vertical axis is representative of frequency.

Figure 8B:
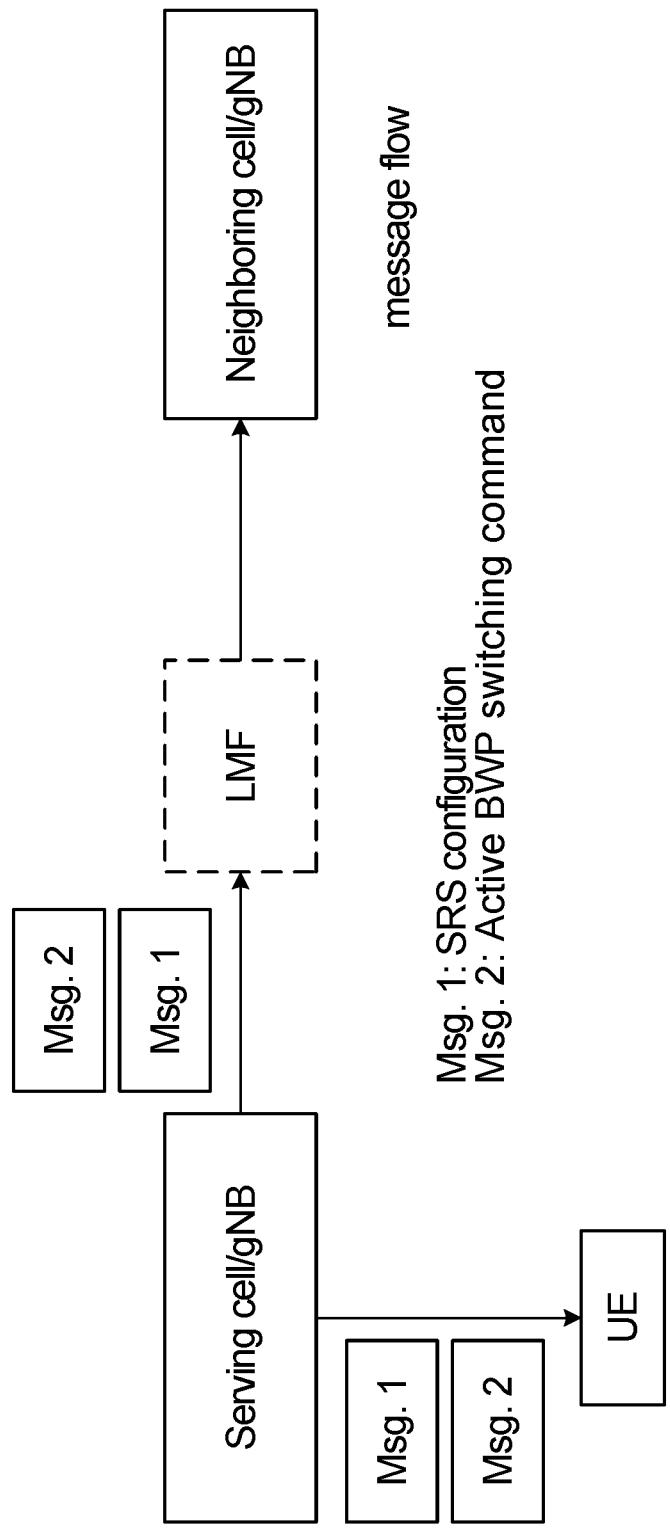
FIG. 8B is a schematic diagram of an example of transmissions between a serving cell/gNB, a UE and a neighboring cell/gNB to implement transmissions as shown in FIG. 8A in accordance with an embodiment of the present application.

FIG. 8B is a schematic diagram of an example message flow between the various telecommunication components involved. The Serving cell/gNB transmits a message (Msg. 1) including SRS configuration to the UE followed at some point by a UL BWP switching command (Msg. 2). The Serving cell/gNB also transmits a message (Msg. 1) including SRS configuration to the Neighboring cell/gNB and at some point in time a message (Msg. 2) notifying the Neighboring cell/gNB that the Neighboring cell/gNB should switch the BWP and look for the SRS in a new UL BWP. The SRS configuration information sent to the Neighboring cell/gNB may not be the exact same information sent to the UE. An LMF is shown in a dashed block between the Serving cell/gNB and the Neighboring cell/gNB indicating that the LMF may occur in some embodiments, but not others.

Below are provided several solutions that may be appropriate to both the first problem described above pertaining to the difference in latency between the serving cell sending a command to the UE and the UE initiating the command and the serving cell sending a notification to the neighboring cell/gNB and the neighboring cell/gNB reconfiguring to receive SRS on a new BWP and the second problem of interference at the neighboring cell/gNB.

A first solution involves using a dedicated positioning bandwidth (BW) for transmitting the SRS used for determining the positioning of the UE. In some embodiments, there is a single dedicated positioning BW on which the SRS is transmitted on and so the SRS is not switched between different BWPs. Therefore, the neighboring cell is always receiving the SRS for positioning purposes on the same positioning BW and there are no switching related latency issues because there is no switching associated with the SRS transmission. Furthermore, if the positioning BW is selected appropriately, the SRS will not interfere with other UL transmissions the neighboring cell receives from UEs that it is serving.

In some embodiments, there may be multiple dedicated positioning BWs that could be used for SRS transmission and the SRS transmissions may be switched from one dedicated positioning BW to another. While this may result in some latency related issues, these issues may be addressed by using some of the solutions described above specific to the first problem, such as transmitting on a first dedicated positioning BW for a period of time after a dedicated positioning BW switching command to ensure the switch from the first dedicated positioning BW to a second dedicated positioning BW is received by the UE. However, even when having the ability to transmit SRS on one of multiple possible dedicated positioning BWs, all or a subset of such dedicated positioning BWs can be selected appropriately so as not to interfere with other scheduled or configured UL transmissions the neighboring cell receives from UEs that it is serving.

In some embodiments, when multiple positioning BWs are configured, the UE can switch SRS transmission from a first positioning BW to a second positioning BW after the LMF or the serving cell/gNB notifies the neighboring cells/gNBs that a positioning BW switch command has been sent to the UE. The UE is notified about the positioning BW switch command by higher layer signaling.

In some embodiments, each UE in a cell transmits SRS in multiple positioning BWs at a given time.

The dedicated positioning BW can be selected based on one of the following options:

Option 1: the dedicated positioning BW is a configured BWP of a configured cell/carrier. In such a case, the dedicated positioning BW for transmitting SRS for determining the position of the UE may be referred to as a "positioning BWP".

In some embodiments, one of multiple UE-specific UL BWPs can be selected and indicated as the positioning BWP. The positioning BWP can be configured using a regular UL BWP configuration. In one alternative, a difference between the positioning BWP and a "regular BWP" is that SRS used for determining the position of the UE can be transmitted in the positioning BWP even if the positioning BWP is not active. In another alternative, a difference between the positioning BWP and a "regular BWP" is that SRS used for determining the position of the UE can only be transmitted in the positioning BWP and only when the positioning BWP is active.

In some embodiments, a BWP separate from the UE-specific UL BWPs is configured as the positioning BWP. The configuration of the positioning BWP may only include a subset of higher-layer parameters as compared to the higher-layer parameters used to configure a regular BWP. When the BWP is separate from the UE-specific UL BWPs, there are two alternatives regarding transmitting PUSCH or PUCCH, or both, in the positioning BWP.

Alternative 1: No PUSCH/PUCCH of any UE is transmitted in the positioning BWP.

Alternative 2: PUSCH/PUCCH can be transmitted in the positioning BWP. In this case, the positioning BWP is still useful since the problem of dynamic BW switching does not occur in this case.

In some embodiments, an initial UL BWP of each serving cell is used for transmission of SRS used for determining the position of a UE.

In some embodiments, a default UL BWP of the UE, if a default UL BWP is configured, is used for transmission of SRS used for determining the position of a UE.

In some embodiments, a first UL BWP of the UE in a cell is used for transmission of SRS used for determining the position of a UE.

Option 2: the dedicated positioning BW is a sub-band of a configured cell/carrier.

In this option, the dedicated positioning BW can be configured for a cell or predefined for a cell, which may be a predefined frequency portion or a sub-band of the cell. In some embodiments, the sub-band may be one of a number of sub-bands in the configured cell/carrier, each having a respective index value and so the configuration may be a few number of bits identifying the sub-band by the index number.

Option 3: the dedicated positioning BW is independent of a configured cell/carrier.

In this option, positioning BW configuration information may include an indication of an NR absolute radio frequency channel number (NR ARFCN) of a reference point in the positioning BW or a frequency reference that defines the lowest-frequency edge, highest-frequency edge, or a center frequency of the positioning BW. This frequency reference can be a NR ARFCN or a center frequency of a synchronization signal block (SSB). The positioning BW configuration may also include a frequency length of the positioning BW or a "numerology", or both.

A group of UEs that share the same dedicated positioning BW may all be served by the same cell/gNB or may belong to two or multiple sub-groups each of which is served by a different cell/gNB. When the group of UEs that share the same dedicated positioning BW are all served by the same cell/gNB, the positioning BW can be configured by the serving cell/gNB serving the group of UEs or by the LMF. When the group of UEs that share the same dedicated positioning BW belong to two or multiple sub-groups each of which is served by a different cell/gNB, the positioning BW can be configured to all of the neighboring cells/gNBs by the LMF.

As described above, in some embodiments, multiple positioning BWs may be configured for use by the UE to transmit SRS used for determining the position of the UE.

In some embodiments, if the positioning BW is not the current active UL BWP or if the active UL BWP does not contain or overlap with the positioning BW, a gap in the active UL BWP may be used for transmitting the SRS for determining the UE position while interrupting other scheduled or configured UL transmissions in the active UL BWP. Alternatively, transmission of the SRS for determining the UE position may be interrupted in order to transmit other scheduled or configured UL signals/channels in the active UL BWP, depending on UE capability and the relative priority of transmitting the SRS for determining the UE position.

In some embodiments, when a gap is needed for UE capability reasons described above, and when the priority of SRS for determining the UE position is higher than other scheduled or configured UL transmissions in the current active BWP, a gap is used in the current active BWP so that the UE does not transmit other scheduled or configured UL transmissions in the current active BWP and instead transmits the SRS in the positioning BW.

In some embodiments, when the priority of SRS for determining the UE position is lower than other scheduled or configured UL transmissions in the current active BWP, the UE does not transmit the SRS in the positioning BW and instead transmits the other scheduled or configured UL transmissions in the current active BWP.

In some embodiments, the UE may receive one or more downlink reference signals (DL RSs) from a neighboring cell/gNB for one or more of A) spatial transmission filter determination, B) pathloss determination, and C) timing advance (TA) calculation specific to the neighbor cell/gNB. The one or more DL RS for determining spatial transmission filter, pathloss or TA can be received by the UE in the same carrier or BW, or both, as the positioning BW or can be received in a different carrier or BW, or both.

Figure 9A:
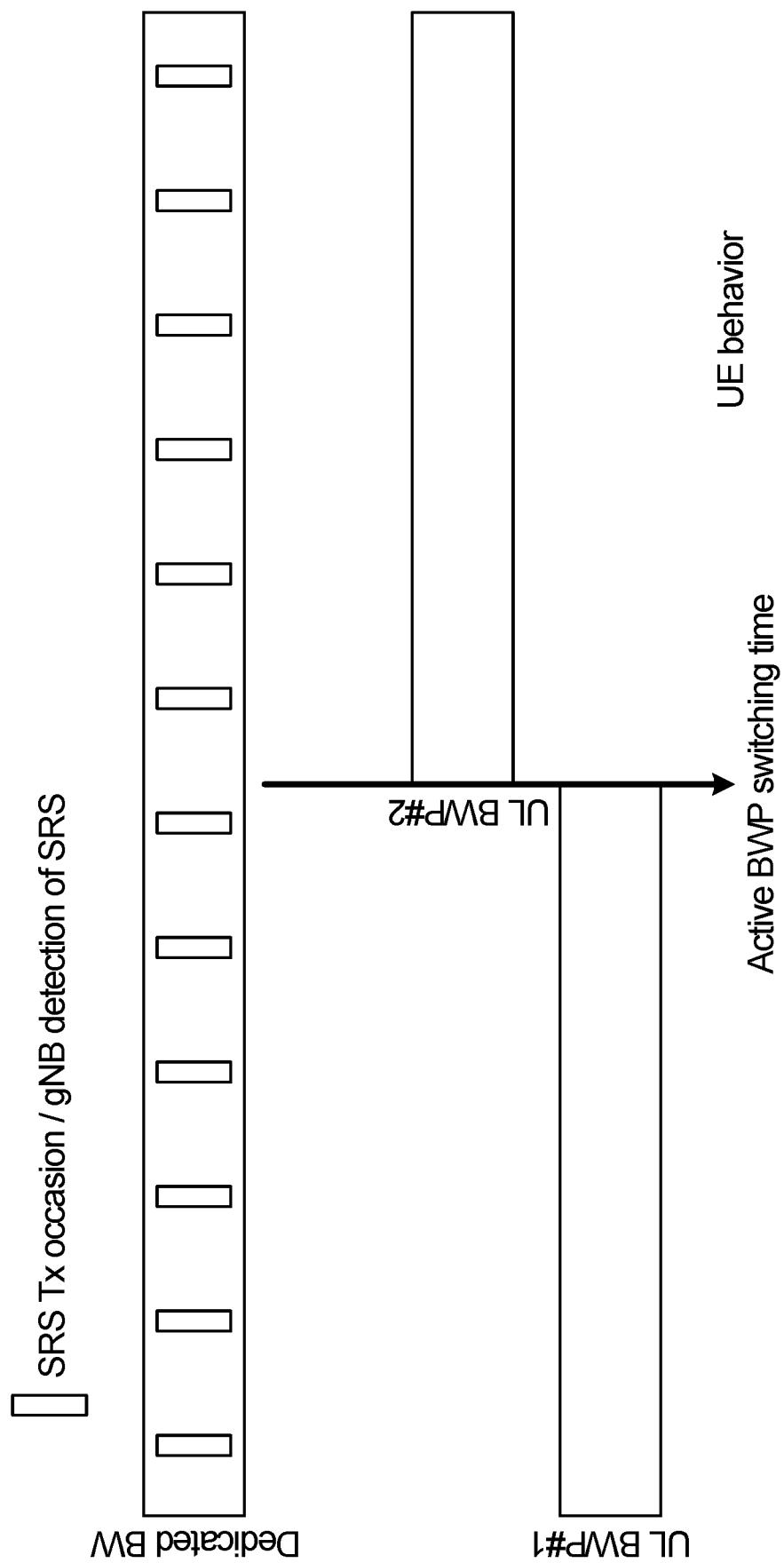
FIG. 9A is an example of transmission of SRS by a UE on a dedicated positioning bandwidth (BW) in accordance with an embodiment of the present application.

FIG. 9A shows an example of SRS used for determining a UE position being transmitted periodically or semi-persistently in a dedicated positioning BW by a UE despite a command to switch other scheduled or configured UL transmissions from a first UL BWP (UL BWP #1) to a second UL BWP (UL BWP #2) having been received and initiated. The horizontal axis is increasing in time and the vertical axis is representative of frequency.

Figure 9B:
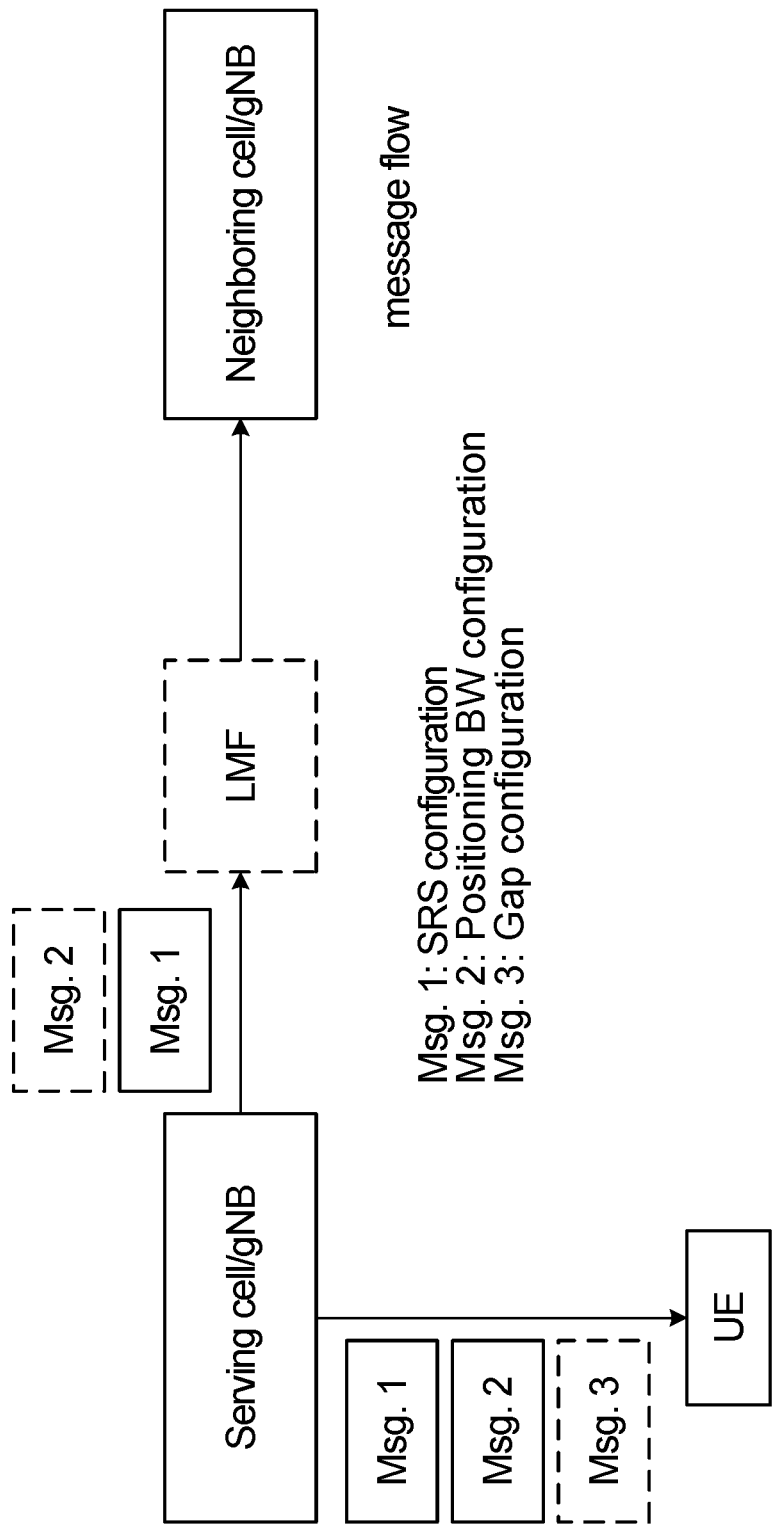
FIG. 9B is a schematic diagram of an example of transmissions between a serving cell/gNB, a UE and a neighboring cell/gNB to implement transmissions as shown in FIG. 9A in accordance with an embodiment of the present application.

FIG. 9B is a schematic diagram of an example message flow between the various telecommunication components involved. The serving cell/gNB transmits a message (Msg. 1) including SRS configuration information to the UE. The Serving cell/gNB may also transmit a positioning bandwidth configuration message (Msg. 2) to define configuration information about the dedicated BW used for transmitting SRS for determining the position of the UE. The Serving cell/gNB may also transmit gap configuration information (Msg. 3) as described above. The Serving cell/gNB also transmits a message (Msg. 1) including SRS configuration information to the Neighboring cell/gNB. The SRS configuration information may not be exactly the same as the configuration information sent to the UE. The Serving cell/gNB may also transmit the positioning bandwidth configuration message (Msg. 2) to define configuration information about the dedicated BW used for transmitting SRS by the UE for determining the position of the UE to the Neighboring cell/gNB. An LMF is shown in a dashed block between the Serving cell/gNB and the Neighboring cell/gNB indicating that the LMF may occur in some embodiments, but not others.

A second solution that may be applicable to both problems 1 and 2 includes SRS carrier switching. 3GPP NR Rel. 15 includes functionality for SRS carrier switching. The SRS may be transmitted in one or multiple carriers (serving cells) that are not configured for either the transmission of PUCCH or PUSCH, or both. A UE can be configured to implement SRS carrier switching using a radio resource control (RRC) parameter "SRS-CarrierSwitching". In Rel. 15, SRS carrier switching is activated using DCI Format 2_3. DCI Format 2_3 can be used to activate SRS carrier switching to one or multiple UEs. When received by a UE, DCI Format 2_3 can activate SRS in multiple cells. The DCI format 2_3 field includes a transmit power control (TPC) command for each serving cell. A UE can be configured to monitor multiple cells for DCI Format 2_3. Such a feature can be defined in a "monitoringCells" field in the "SRS-CarrierSwitching" information element (IE).

During SRS transmission on a PUCCH-less cell or PUSCH-less cell (i.e. transmission of a carrier switching SRS), the UE may temporarily suspend the UL transmission on a serving cell with PUSCH in the same cell group to allow the PUSCH-less cell to transmit SRS. A "srs-SwitchFromServCell Index" field in the SRS-CarrierSwitching IE indicates a serving cell whose UL transmission may be interrupted during SRS transmission on a PUSCH-less cell.

Therefore, the second solution involves using a specialized DCI to trigger positioning SRS transmission in a set of serving cells. In some embodiments, this may be a DCI similar to DCI format 2_3. In some embodiments, DCI format 2_3 could be used in a form accepted in a telecommunication standard or a modified form thereof. Below are three options related to using a DCI to trigger the positioning SRS.

Option 1: For each cell indicated in a "srs-TPC-PDCCH-Group" field of a DCI, the UE transmits the SRS that is configured in an active UL BWP for an activated cell or alternatively the UE transmits the SRS that is configured in an UL BWP with index provided by a firstActiveUplinkBWP-Id field of the activated or de-activated cell.

Option 2: For each cell indicated in a "srs-TPC-PDCCH-Group" field of a DCI, the UE transmits the SRS that is configured in the positioning BW of the cell.

Option 3: for each cell in a "srs-TPC-PDCCH-Group" field of a DCI, a UL BWP of the cell can be identified where the UE should transmit SRS for positioning purposes.

In some embodiments, the cells in the "srs-TPC-PDCCH-Group" field may or may not be PUSCH-less cells or PUCCH-less cells.

Additional solutions that may be used to address the first and second problems identified above could be combinations of various solutions identified above. For instance, in some embodiments, SRS that is transmitted initially in a first UL BWP, for example in an active UL BWP, may be switched to a dedicated positioning BW for transmitting SRS, for determining UE positioning, upon receipt of a bandwidth switching command. Conversely, the SRS could be switched from a dedicated positioning BW to an UL BWP such as the Active UL BWP when a bandwidth switching command is received.

In a particular example, the UE sends SRS used for determining the position of the UE in an UL BWP (e.g., active UL BWP) until explicitly or implicitly instructed to switch to the positioning BW. An implicit indication can result from the switching of an active BWP from a first BWP to a second BWP. In such a case, the neighboring cell/gNB also looks for the SRS in the dedicated positioning BW once it fails to detect periodic SRS (P-SRS) or aperiodic SRS (AP-SRS) or semi-persistent SRS (SP-SRS) in the first BWP.

The SRS transmission switching to the dedicated positioning BW can occur after some configurable delay, for example, as described above in the third solution to the first problem.

Figure 10A:
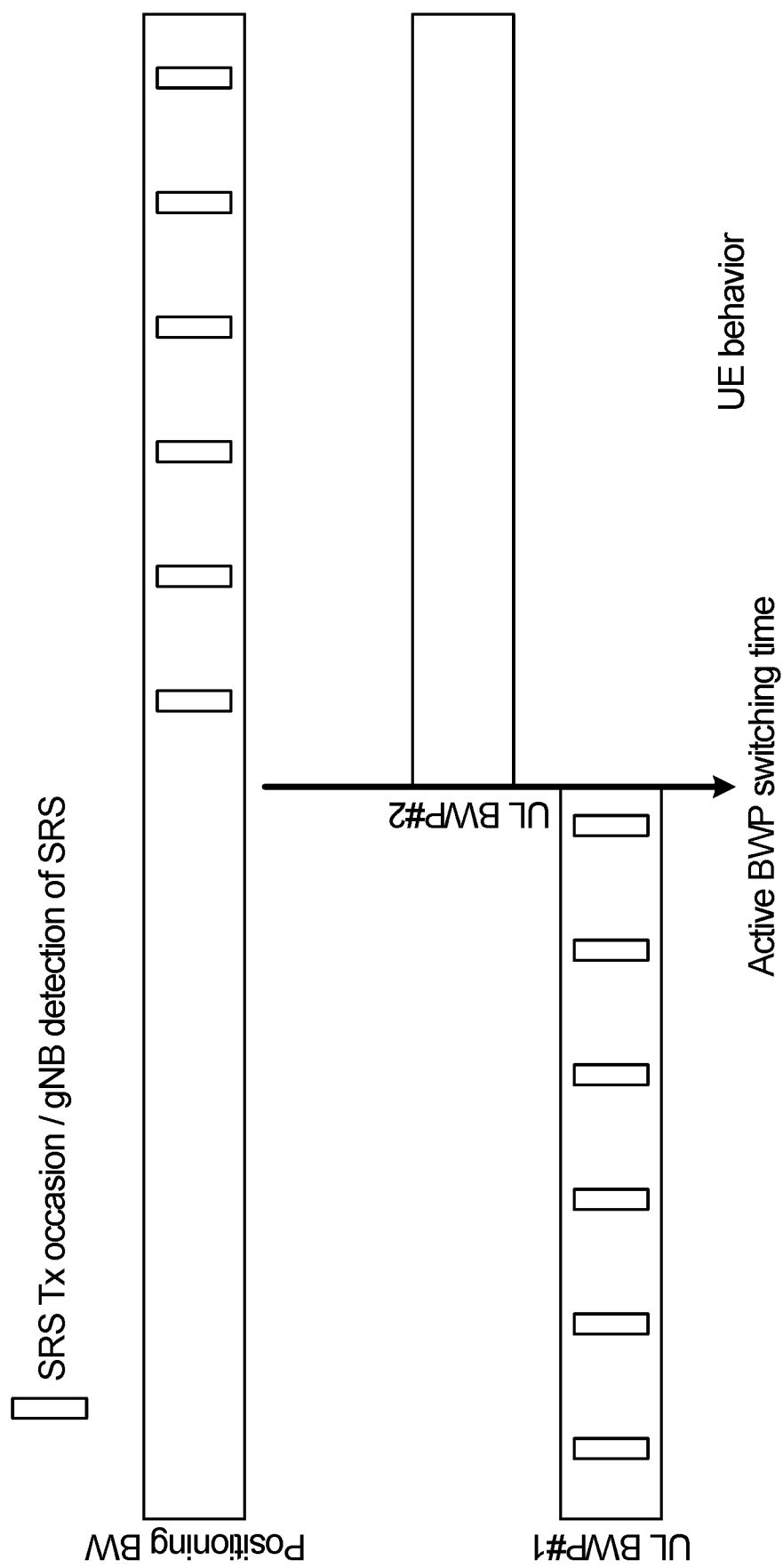
FIG. 10A is a first example of transmission of SRS by a UE on a first UL BWP and then switching to a dedicated positioning BW after receiving an UL BWP switching command in accordance with an embodiment of the present application.

FIG. 10A shows an example of SRS being transmitted periodically or semi-persistently in a first UL BWP (UL BWP #1) by a UE and after a command is received to switch other scheduled or configured UL transmissions to a second UL BWP (UL BWP #2), the SRS is switched to a dedicated positioning BW (Positioning BW) for transmission of SRS used for determining a UE position. The horizontal axis is increasing in time and the vertical axis is representative of frequency.

Figure 10B:
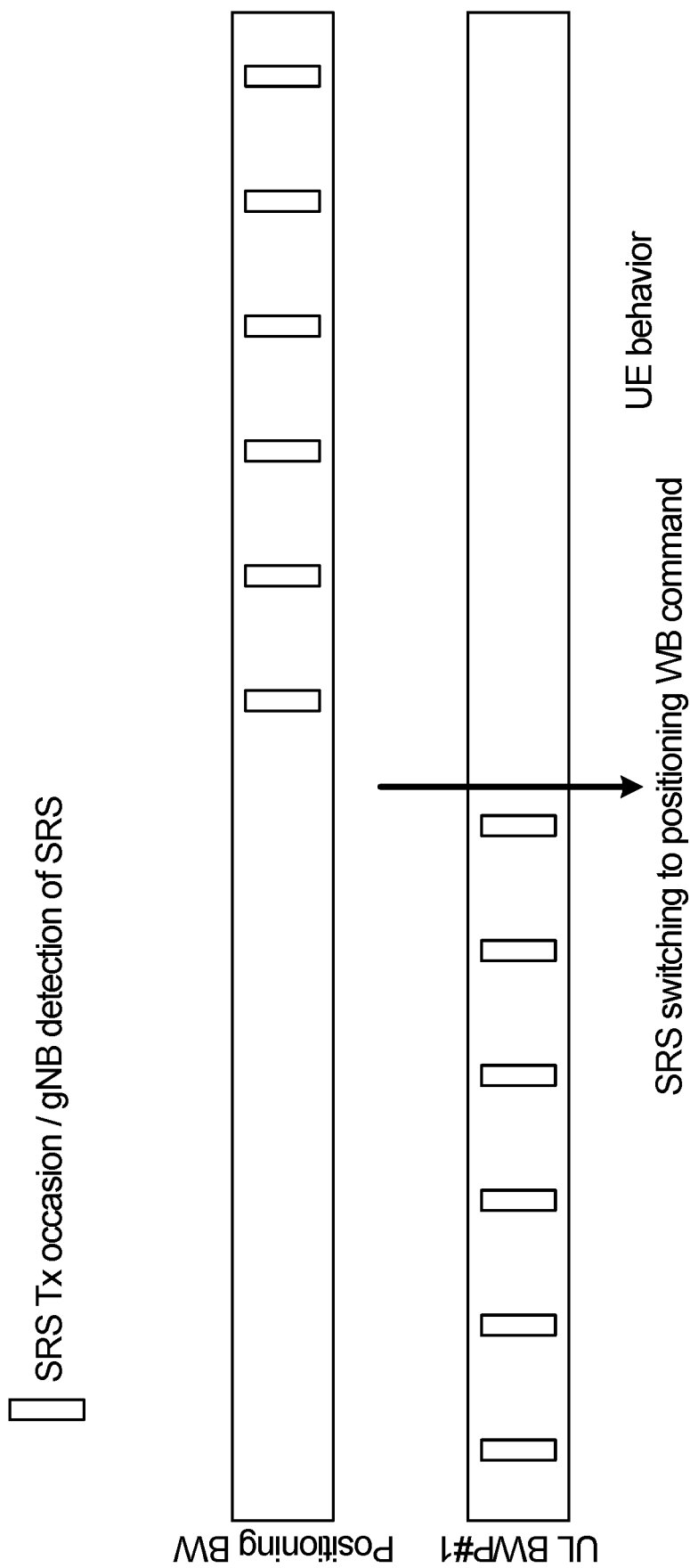
FIG. 10B is a second example of transmission of SRS by a UE on a first UL BWP and then switching to a dedicated positioning BW after receiving an SRS switching command in accordance with an embodiment of the present application.

FIG. 10B shows an example of SRS being transmitted periodically or semi-persistently in a first UL BWP (UL BWP #1) by a UE and after a command is received to switch the SRS to a dedicated positioning BW (Positioning BW) for transmission of SRS used for determining a UE position, the SRS is switched to the dedicated positioning BW. The horizontal axis is increasing in time and the vertical axis is representative of frequency.

Figure 10C:
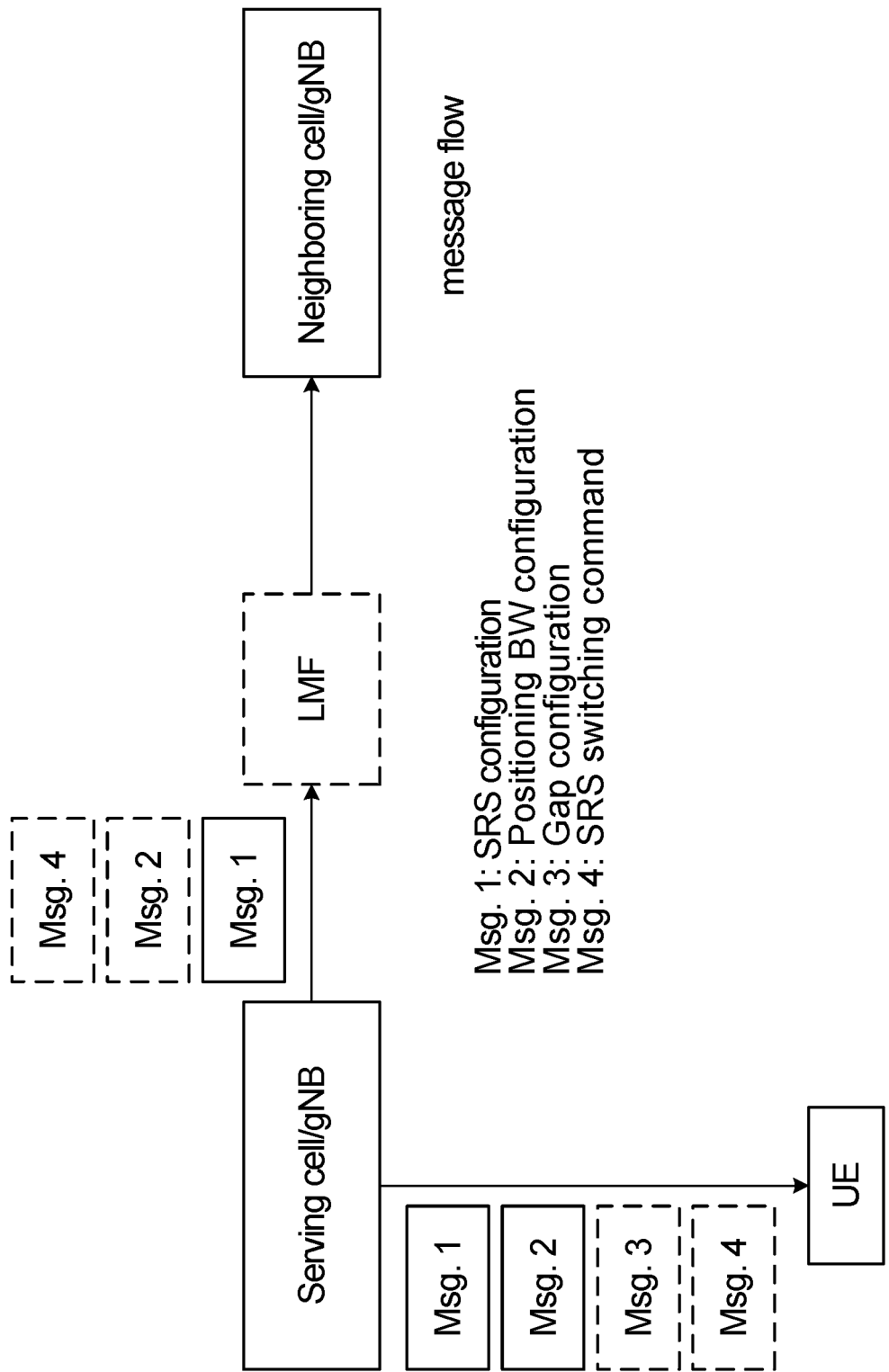
FIG. 10C is a schematic diagram of an example of transmissions between a serving cell/gNB, a UE and a neighboring cell/gNB to implement transmissions as shown in FIG. 10A or FIG. 10B in accordance with an embodiment of the present application.

FIG. 10C is a schematic diagram of an example message flow between the various telecommunication components involved. The Serving cell/gNB transmits a message (Msg. 1) including SRS configuration information to the UE. The Serving cell/gNB may also transmit a positioning bandwidth configuration message (Msg. 2) to define configuration information about the dedicated positioning BW used for transmitting SRS for determining the position of the UE. The Serving cell/gNB may also transmit gap configuration information (Msg. 3) to the UE as described above. The Serving cell/gNB may also transmit an SRS switching command (Msg. 4) to the UE as described above. The Serving cell/gNB also transmits a message (Msg. 1) including SRS configuration information to the Neighboring cell/gNB. The SRS configuration information may not be exactly the same as the SRS configuration information sent to the UE. The Serving cell/gNB may also transmit a positioning bandwidth configuration message (Msg. 2) to define configuration information about the dedicated positioning BW used for transmitting SRS by the UE for determining the position of the UE to the Neighboring cell/gNB. The Serving cell/gNB may also transmit an SRS switching command (Msg. 4) to the Neighboring cell/gNB as described above. An LMF is shown in a dashed block between the Serving cell/gNB and the Neighboring cell/gNB indicating that the LMF may occur in some embodiments, but not others.

Figure 11A:
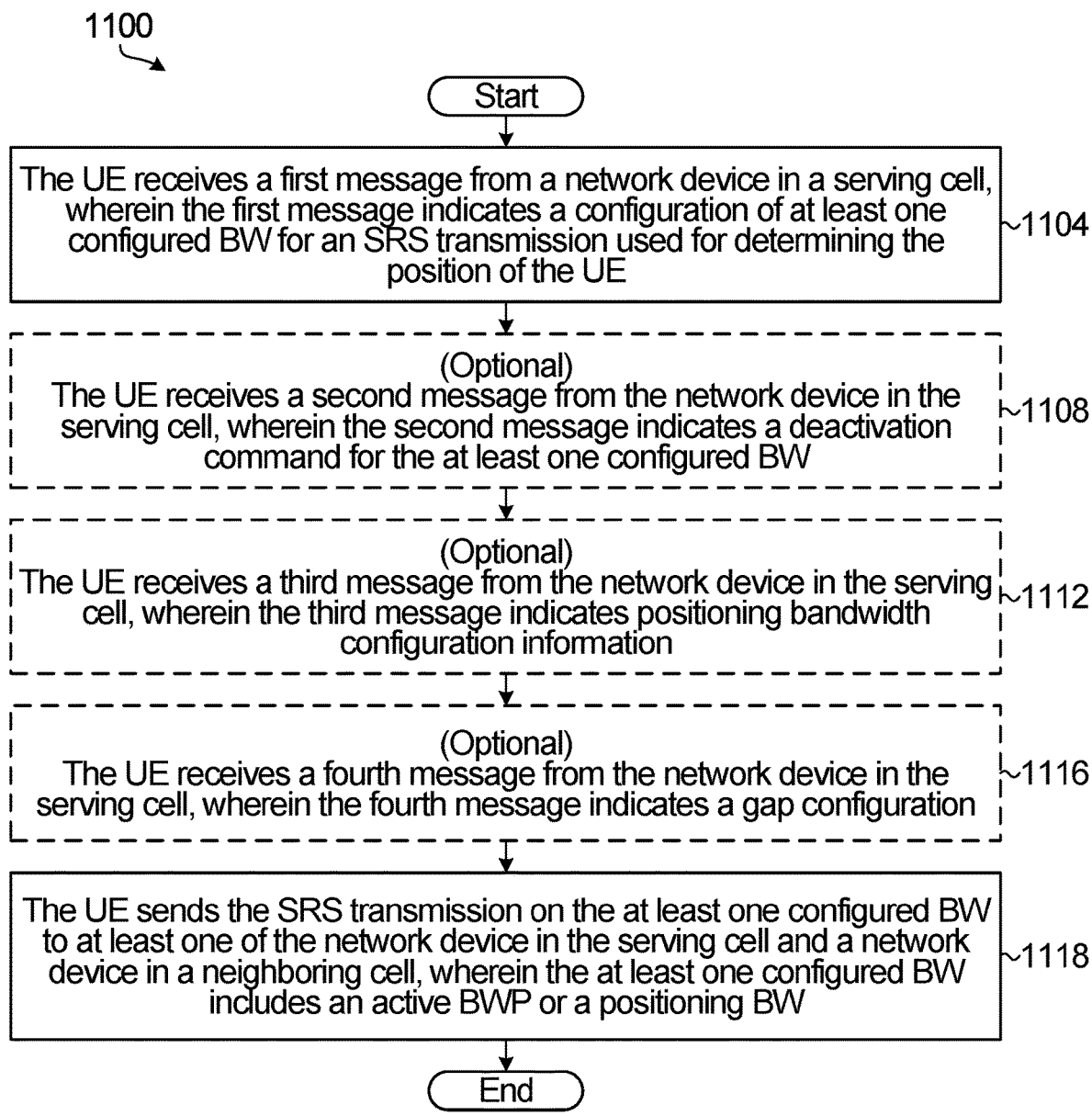
FIG. 11A is a flow chart illustrating an example of a method performed by a UE in accordance with an embodiment of the present application.

FIG. 11A is a flow chart 1100 of an example method that may be performed by a UE that is in communication with a network device in a serving cell and is transmitting SRS information to the network device in the serving cell and at least one network device in a neighboring cell in order to determine the position of the UE or for other mobility related concerns. At 1104, the UE receives a first message from the network device in the serving cell. The first message indicates a configuration of at least one configured bandwidth (BW) for an SRS transmission used for determining the position of the UE. At 1108, optionally, the UE receives a second message from the network device in the serving cell, wherein the second message indicates a deactivation command for the at least one configured BW. At 1112, optionally, the UE receives a third message from the network device in the serving cell, wherein the third message indicates positioning bandwidth configuration information. At 1116, optionally, the UE receives a fourth message from the network device in the serving cell, wherein the fourth message indicates a gap configuration. The gap configuration is used for: allowing transmission of the SRS on a first BWP of the at least one configured BW while interrupting scheduled or configured UL transmissions in a second BWP of the at least one configured BW or interrupting SRS transmission occasions on the first BWP of the at least one configured BW to allow scheduled or configured UL transmissions on the second BWP of the at least one configured BW. At 1118, the UE sends the SRS transmission on the at least one configured BW to at least one of the network device in the serving cell and the network device in the neighboring cell, wherein the at least one configured BW includes an active bandwidth part (BWP) or a positioning BW.

Figure 11B:
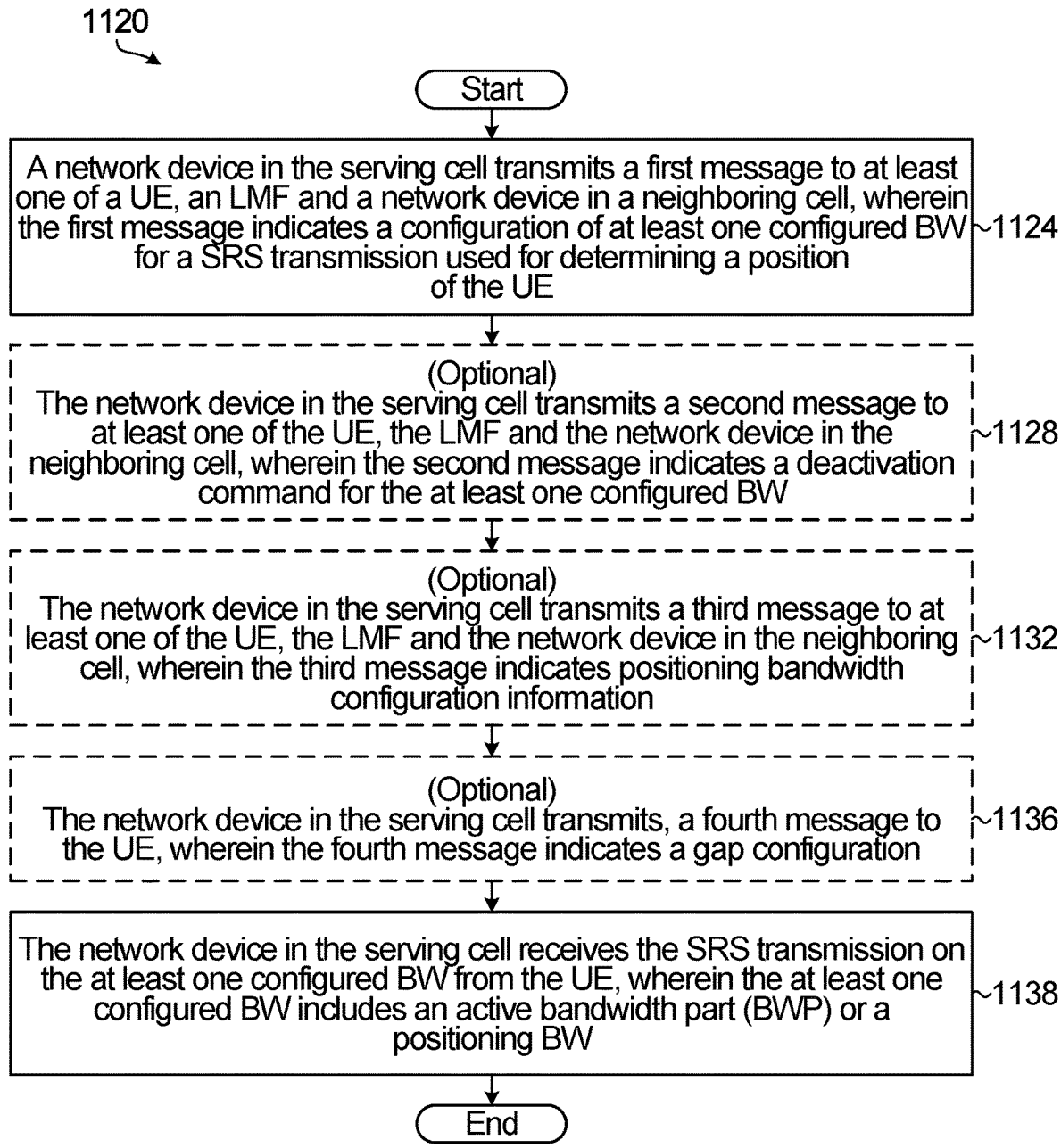
FIG. 11B is a flow chart illustrating an example of a method performed by a serving cell/gNB in accordance with an embodiment of the present application.

FIG. 11B is a flow chart 1120 of an example method that may be performed by a network device in a serving cell that is in communication with a UE, at least one network device in a neighboring cell and possible a location management function (LMF). At 1124, the network device in the serving cell transmits a first message to at least one of the UE, the LMF and the network device in the neighboring cell. The first message indicates a configuration of at least one configured bandwidth (BW) for a SRS transmission used for determining a position of the UE. At 1128, optionally, the network device in the serving cell transmits a second message to at least one of the UE, the LMF and the network device in the neighboring cell, wherein the second message indicates a deactivation command for the at least one configured BW. At 1132, optionally, the serving cell transmits a third message to at least one of the UE, the LMF and the network device in the neighboring cell, wherein the third message indicates positioning bandwidth configuration information. At 1136, optionally, the network device in the serving cell transmits a fourth message to the UE, wherein the fourth message indicates a gap configuration. The gap configuration is used for: allowing transmission of the SRS on a first BWP of the at least one configured BW while interrupting scheduled or configured UL transmissions in a second BWP of the at least one configured BW or interrupting SRS transmission occasions on the first BWP of the at least one configured BW to allow scheduled or configured UL transmissions on the second BWP of the at least one configured BW. At 1138, the network device in the serving cell receives the SRS transmission on the at least one configured BW from the UE, wherein the at least one configured BW includes an active bandwidth part (BWP) or a positioning BW.

Figure 11C:
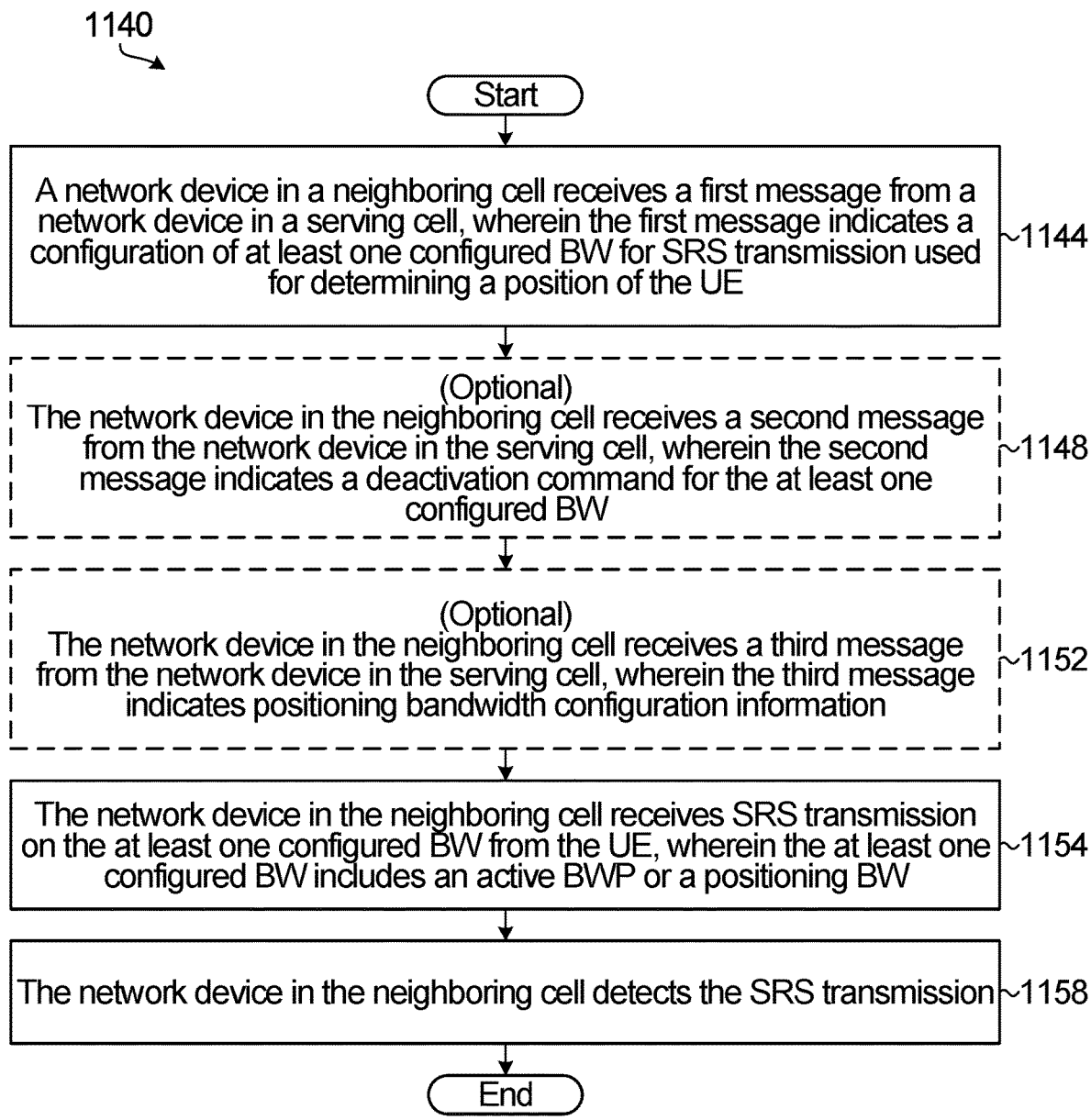
FIG. 11C is a flow chart illustrating an example of a method performed by a neighboring cell/gNB in accordance with an embodiment of the present application.

FIG. 11C is a flow chart 1140 of an example method that may be performed by a network device in a neighboring cell that is configured to receive SRS information from a UE in order to determine the position of the UE, or for other mobility related concerns, and to receive information from a network device in a serving cell of the UE or LMF to notify the network device in the neighboring cell relevant information to receive the SRS information. At 1144, the network device in the neighboring cell receives a first message from another network device, wherein the first message indicates a configuration of at least one configured bandwidth (BW) for sounding reference signal (SRS) transmission used for determining a position of the UE. The another network device may be the serving cell of the UE or LMF. At 1148, optionally, the UE receives a second message from the another network device, wherein the second message indicates a deactivation command for the at least one configured BW. At 1152, optionally, the UE receives a third message from the another network device, wherein the third message indicates positioning bandwidth configuration information. At 1154, the network device in the neighboring cell receives SRS transmission on the at least one configured BW from the UE, wherein the at least one configured BW includes an active bandwidth part (BWP) or a positioning BW. At 1158, the neighboring cell detects the SRS transmission.

Although the description above substantially refers to a network device of a serving cell, a serving cell, a serving cell/gNB, a network device of a neighboring cell, a neighboring cell, and a neighboring cell/gNB, it is to be understood that this terminology is more generally representative of a network side base station or access point for a user equipment or electronic device to the network.

Below are provided several solutions that are appropriate to the third problem described above pertaining to the second latency related problem of inter-cell/inter-gNB latency using the XnAP or NR PPa protocols to communicate a SP-SRS activation and/or de-activation command or an AP-SRS triggering message.

According to 38.214, latency between a SRS activation/deactivation command using a MAC-CE and the corresponding action at the UE is $3N_{slot}^{subframe,\mu}+1$. That is, 4 slots for 15 kHz SCS or 7 slots in 30 kHz SCS.

According to 38.214, latency between an SRS triggering command using DCI and the corresponding action at the UE is k slots where k is given in RRC and its maximum value is 32, k being an integer value.

Latency between the command and the UE action is far less than the required time to send the command to the neighboring cell/gNB notifying it about the SP-SRS activation/de-activation and/or AP-SRS triggering.

In a first proposed solution, when the SRS is for positioning purposes, the latency can be increased between the command and the corresponding UE action. In the case of SP-SRS, the latency can be increased. A particular example is based on $XN_{slot}^{subframe,\mu}+1$ with, e.g., X=[10]. In the case of AP-SRS, the maximum value of K can be increased, for example from 32 to 128.

In a second proposed solution, when the SRS is for positioning purposes, the UE can be provided with a latency command in DCI for AP-SRS or MAC-CE for SP-SRS that overrides a previously configured latency value. The previously configured latency value may be an accepted latency value from a telecommunications standard.

A third proposed solution involves sending an activation/de-activation command for SP-SRS, or a triggering command for AP-SRS, to the UE with a particular delay. For example, this may be done after the corresponding command is delivered to the neighboring cell/gNB, so that the neighboring cell/gNB is prepared to receive the SRS, when the SRS is switched to a new bandwidth or activated on a given bandwidth.

According to a first example there is provided a method involving: a user equipment (UE) transmitting a sounding reference signal (SRS), used for determining the position of the UE on a first bandwidth part (BWP); the UE receiving a message to trigger switching transmission of uplink (UL) channels and signaling from the first BWP to a second BWP; the UE continuing to transmit the SRS used for determining the position of the UE on the first BWP.

The method of the first example further involving the UE deactivating the transmitting of the SRS used for determining the position of the UE on the first BWP.

In some instances, the UE deactivating the transmitting of the SRS on the first BWP occurs based on at least one of: the UE receiving an explicit command to deactivate the transmitting of the SRS on the first BWP; the UE receiving an indication of a determined location of the UE; the UE receiving an acknowledgement of a determined location of the UE; the UE receiving an activation command for SRS in the second BWP; after a delay period; and after a timer expires.

In some instances, the delay period may be configured: in a radio resource control (RRC) message; or in downlink control information (DCI).

In some instances, the delay period starts from: in a case of DCI based BWP switching, a slot where the UE receives the message to trigger switching from the first BWP to the second BWP; or in a case of timer-based switching, a slot during which a BWP switching timer expires.

The method of the first example further involving the UE activating the transmitting of the SRS used for determining the position of the UE on the second BWP.

In some instances, the UE activating the transmitting on the second BWP occurs based on at least one of: the UE receiving an explicit command to activate the transmitting of the SRS on the second BWP; and the UE receiving an implicit or explicit command to deactivate transmitting of the SRS in the first BWP.

In some instances, the UE deactivating the transmitting of the SRS on the first BWP occurs after at least a preconfigured delay and is followed by activation of the transmitting on the second BWP.

In some instances, the preconfigured delay is determined by a timer which is triggered implicitly by the UE receiving BWP switching downlink control information (DCI) or when a BWP switching timer expires.

The method of the first example further involving receiving an indication of the pre-configured delay in higher layer signaling or a DCI.

The method of the first example further involving receiving a switching command to switch transmitting of the SRS from the first BWP to the second BWP.

In some instances, when the UE cannot transmit the SRS used for determining the position of the UE on the first BWP and other scheduled UL channels and signals on the second BWP at the same time, the UE: transmits the SRS used for determining the position of the UE on the first BWP and does not transmit the other scheduled UL channels and signals on the second BWP; or does not transmit the SRS used for determining the position of the UE on the first BWP and transmits the other scheduled UL channels and signals on the second BWP.

In some instances, a decision to transmit the SRS used for determining the position of the UE on the first BWP or transmit the other scheduled UL channels and signals on the second BWP is based on the priority of the SRS transmission.

The method of the first example further involving receiving configuration information pertaining to a transmission gap allowed for switching between transmitting the SRS used for determining the position of the UE on the first BWP and transmitting the other scheduled UL channels and signals on the second BWP.

The method of the first example further involving receiving configuration information pertaining to transmission of the SRS used for determining the position of the UE.

In some instances, the configuration information pertaining to the SRS comprises one of more of: parameters to determine a SRS sequence; resource mapping; transmit power configuration; spatial transmission filter; and periodicity.

According to a second example there is provided a method involving: a base station transmitting to a user equipment (UE) a command to trigger switching transmission of UL channels and signaling by the UE from a first bandwidth part (BWP) to a second BWP; the base station transmitting to a location management function (LMF) or a neighboring base station a notification that the command to trigger switching transmission of uplink (UL) channels and signaling by the UE from the first BWP to the second BWP has been sent to a UE; and the network device receiving a sounding reference signal (SRS) used for determining the position of the UE on the first BWP for a period of time after other UL channels and signaling have been received on the second BWP.

The method of the second example further involving the base station transmitting to the UE at least one of: an explicit command to deactivate the transmitting of the SRS on the first BWP; an indication of a determined location of the UE; an acknowledgement of a determined location of the UE; an activation command for SRS in the second BWP; and an indication of a delay period.

In some instances, transmitting the indication of the delay period involves: transmitting the indication of the delay period in a radio resource control (RRC) message; or transmitting the indication of the delay period in downlink control information (DCI)

In some instances, the delay period starts from: in a case of DCI based BWP switching, a slot where a message to trigger switching from the first BWP to the second BWP occurs; or in a case of timer-based switching, a slot during which a BWP switching timer expires.

The method of the second example further involving the base station transmitting to the UE at least one of: an explicit command to activate the transmitting of the SRS on the second BWP; and an implicit or explicit deactivation command for transmitting of the SRS in the first BWP.

The method of the second example further involving the base station transmitting to the UE an indication of a pre-configured delay in higher layer signaling or a DCI, the delay to occur between switching transmission of UL channels and signaling from the first BWP to the second BWP and the switching of the SRS used for determining the position of the UE from the first BWP to the second BWP.

The method of the second example further involving transmitting to the UE a switching command to switch transmitting the SRS from the first BWP to the second BWP.

The method of the second example further involving transmitting to the LMF or the neighboring base station an indication that the switching command to switch transmitting of the SRS from the first BWP to the second BWP has been sent to the UE.

The method of the second example further involving transmitting configuration information to the UE pertaining to a transmission gap allowed for switching between transmitting the SRS used for determining the position of the UE on the first BWP and transmitting the other scheduled UL channels and signals on the second BWP.

The method of the second example further involving transmitting configuration information pertaining to the SRS used for determining the position of the UE.

In some instances, the configuration information pertaining to the SRS involves one of more of: parameters to determine a SRS sequence; resource mapping; transmit power configuration; spatial transmission filter; and periodicity.

According to a third example there is provided a method involving: a base station neighboring a serving cell receiving a notification that a command to trigger switching transmission of uplink (UL) channels and signaling from a first bandwidth part (BWP) to a second BWP has been sent to a user equipment (UE); and the base station receiving a sounding reference signal (SRS) used for determining the position of the UE on the first BWP for a period of time after other UL channels and signaling have been received on the second BWP.

The method of the third example further involving receiving a notification that a command to switch transmitting of the SRS from the first BWP to the second BWP has been sent to the UE.

The method of the third example further involving receiving a notification that a command to deactivate transmitting of the SRS on the first BWP has been sent to the UE.

The method of the third example further involving receiving a notification that a command to activate transmitting of the SRS on the second BWP has been sent to the UE.

The method of the third example further involving receiving configuration information pertaining to the SRS used for determining the position of the UE.

In some instances, the configuration information pertaining to the SRS involves one of more of: parameters to determine a SRS sequence; resource mapping; transmit power configuration; spatial transmission filter; and periodicity According to a fourth example there is provided a method involving: the base station transmitting to a user equipment (UE): configuration information pertaining to a sounding reference signal (SRS) used for determining a position of the UE, the configuration information including an identification of bandwidth parts (BWPs) that could be used for transmitting the SRS used for determining the position of the UE; and a command to trigger switching transmission of the SRS used for determining the position of the UE and uplink (UL) channels and signaling from a first BWP to a second BWP; the base station transmitting to a location management function (LMF) or a neighboring base station: configuration information pertaining to the SRS used for determining the position of the UE, the configuration information including an identification of the BWPs that could be used for transmitting the SRS used for determining the position of the UE; and a notification that the command to trigger switching transmission of the SRS used for determining the position of the UE and UL channels and signaling from a first BWP to a second BWP has been sent to the UE; the base station receiving the SRS used for determining the position of the UE on the first BWP for a period of time after other UL channels and signaling have been received on the second BWP.

According to a fifth example there is provided a method involving: a base station neighboring a serving cell receiving configuration information pertaining to a sounding reference signal (SRS) used for determining a position of a user equipment (UE), the configuration information including an identification of bandwidth parts (BWPs) that could be used for transmitting the SRS used for determining the position of the UE; the base station receiving a notification that a command to trigger switching transmission of SRS used for determining the position of the UE and uplink (UL) channels and signaling from a first BWP to a second BWP has been sent to the UE; the base station receiving the SRS used for determining the position of the UE on the first BWP for a period of time after other UL channels and signaling have been received on the second BWP; and the base station performing blind detection of signals received on each of the BWPs identified to the base station that could be used for transmitting the SRS used for determining the position of the UE.

According to a sixth example there is provided a method involving: a base station transmitting to a user equipment (UE) a command to trigger switching transmission of a sounding reference signal (SRS) used for determining the position of the UE and uplink (UL) channels and signaling from a first bandwidth part (BWP) to a second BWP; the base station transmitting to a location management function (LMF) or a neighboring base station a notification that the command to trigger switching transmission of the SRS used for determining the position of the UE and UL channels and signaling from a first BWP to a second BWP has been sent to the UE; the base station receiving the SRS used for determining the position of the UE on the first BWP for a period of time after other UL channels and signaling have been received on the second BWP.

The method of the sixth example further involving the base station transmitting to the UE configuration information pertaining to the SRS used for determining the position of the UE.

The method of the sixth example further involving the base station transmitting to the LMF or the neighboring base station configuration information pertaining to the SRS used for determining the position of the UE.

According to a seventh example there is provided a method involving: a base station neighboring a serving cell receiving a notification that a command to trigger switching transmission of a sounding reference signal (SRS) used for determining the position of a user equipment (UE) and uplink (UL) channels and signaling from a first bandwidth part (BWP) to a second BWP has been sent to the UE; the base station receiving the SRS used for determining the position of the UE on the second BWP; and the base station measuring of signals received on the SRS used for determining the position of the UE on the second BWP.

The method of the seventh example further involving the base station receiving configuration information pertaining to the SRS used for determining the position of the UE.

According to an eighth example there is provided a method involving: a user equipment (UE) receiving configuration information for configuring a dedicated bandwidth part for transmitting a sounding reference signal (SRS) used for determining the position of the UE; and the UE transmitting the SRS used for determining the position of the UE on the dedicated bandwidth.

The method of the eighth example further involving: the UE receiving a message to trigger switching transmission of UL channels and signaling from a first bandwidth part (BWP) to a second BWP; and the UE continuing to transmit the SRS used for determining the position of the UE on the dedicated bandwidth.

In some instances, the dedicated bandwidth is one of: a bandwidth part (BWP) of a configured cell or carrier; a sub-band of a configured cell or carrier; or a bandwidth independent of a configured cell or carrier.

In some instances, the BWP of the configured cell or carrier is one of: a UE specific uplink (UL) BWP; an initial UL BWP; a default UL BWP; or a first UL BWP.

The method of the eighth example further involving receiving configuration information to configure the dedicated bandwidth.

In some instances, receiving the configuration information involves: receiving configuration information that is common to multiple UEs from a location management function (LMF); or receiving configuration information that is UE specific from a location management function (LMF) or a serving base station.

In some instances, the dedicated bandwidth is one of a plurality of dedicated bandwidth available to the UE for transmitting of the SRS used for determining the position of the UE.

In some instances, when the UE cannot transmit the SRS used for determining the position of the UE on the dedicated bandwidth and other scheduled UL channels and signals on the first BWP or the second BWP at the same time, the UE: transmits the SRS used for determining the position of the UE on the dedicated bandwidth and does not transmit the other scheduled UL channels and signals on the first BWP or second BWP; or does not transmit the SRS used for determining the position of the UE on the dedicated bandwidth and transmits the other scheduled UL channels and signals on the first BWP or second BWP.

In some instances, a decision to transmit the SRS used for determining the position of the UE on the dedicated bandwidth or transmit the other scheduled UL channels and signals on the first BWP or second BWP is based on the priority of the SRS transmission.

The method of the eighth example further involving receiving configuration information pertaining to a transmission gap allowed for switching between transmitting the SRS used for determining the position of the UE on the dedicated bandwidth and transmitting the other scheduled UL channels and signals on the first BWP or second BWP.

The method of the eighth example further involving receiving configuration information pertaining to transmission of the SRS used for determining the position of the UE.

In some instances, the configuration information pertaining to the SRS involves one of more of: parameters to determine a SRS sequence; resource mapping; transmit power configuration; spatial transmission filter; and periodicity.

The method of the eighth example further involving the UE receiving a downlink reference signal (DMRS) from a base station neighboring a serving cell.

According to a ninth example there is provided a method involving: a base station transmitting configuration information for configuring a dedicated bandwidth for transmitting a sounding reference signal (SRS) used for determining the position of a user equipment (UE); and the base station receiving the SRS used for determining the position of the UE on the dedicated bandwidth.

The method of the ninth example further involving: the base station transmitting a command to trigger switching transmission of uplink (UL) channels and signaling from a first BWP to a second BWP; the base station transmitting to a location management function (LMF) or a neighboring base station a notification that the command to trigger switching transmission of UL channels and signaling from the first BWP to the second BWP has been sent to the UE; and the base station receiving the SRS used for determining the position of the UE on the dedicated bandwidth after other UL channels and signaling have been received on the second BWP.

In some instances, the dedicated bandwidth is one of: a bandwidth part (BWP) of a configured cell or carrier; a sub-band of a configured cell or carrier; or a bandwidth independent of a configured cell or carrier.

In some instances, the BWP of the configured cell or carrier is one of: a UE specific uplink (UL) BWP; an initial UL BWP; a default UL BWP; or a first UL BWP.

The method of the ninth example further involving transmitting configuration information to configure the dedicated bandwidth.

In some instances, transmitting the configuration information involves transmitting UE specific configuration information.

In some instances, the dedicated bandwidth is one of a plurality of dedicated bandwidth available to the UE for transmitting the SRS used for determining the position of the UE and the base station transmits configuration information identifying each of the plurality of dedicated bandwidth.

The method of the ninth example further involving transmitting configuration information pertaining to a transmission gap allowed for the UE to switch between transmitting the SRS used for determining the position of the UE on the dedicated bandwidth and the UE transmitting the other scheduled UL channels and signals on the first BWP or second BWP.

The method of the ninth example further involving transmitting configuration information pertaining to transmission of the SRS used for determining the position of the UE.

In some instances, the configuration information pertaining to the SRS involves one of more of: parameters to determine a SRS sequence; resource mapping; transmit power configuration; spatial transmission filter; and periodicity.

The method of the ninth example further involving the UE receiving a downlink reference signal (DMRS) from a base station neighboring a serving cell.

According to a tenth example there is provided a method involving: a base station neighboring a serving cell receiving configuration information sent to a user equipment (UE) for configuring a dedicated bandwidth for transmitting a sounding reference signal (SRS) used for determining the position of the UE; and the base station neighboring the serving cell receiving a sounding reference signal (SRS) used for determining the position of the UE on the dedicated bandwidth.

The method of the tenth example further involving: the base station neighboring the serving cell receiving a notification that a command to trigger switching transmission of uplink (UL) channels and signaling from a first BWP to a second BWP has been sent to the UE; and the base station neighboring the serving cell receiving the SRS used for determining the position of the UE on the dedicated bandwidth after other UL channels and signaling have been received on the second BWP.

In some instances, the dedicated bandwidth is one of: a bandwidth part (BWP) of a configured cell or carrier; a sub-band of a configured cell or carrier; or a bandwidth independent of a configured cell or carrier.

In some instances, the BWP of the configured cell or carrier is one of: a UE specific uplink (UL) BWP; an initial UL BWP; a default UL BWP; or a first UL BWP.

The method of the tenth example further involving receiving configuration information to configure the dedicated bandwidth.

In some instances, the dedicated bandwidth is one of a plurality of dedicated bandwidth available to the UE for transmitting the SRS used for determining the position of the UE and the base station neighboring the serving cell receives configuration information identifying each of the plurality of dedicated bandwidth.

The method of the tenth example further involving receiving configuration information pertaining to a transmission gap allowed for the UE to switch between transmitting the SRS used for determining the position of the UE on the dedicated bandwidth and the UE transmitting the other scheduled UL channels and signals on the first BWP or second BWP.

The method of the tenth example further involving receiving configuration information pertaining to transmission of the SRS used for determining the position of the UE.

In some instances, the configuration information pertaining to the SRS involves one of more of: parameters to determine SRS sequence; resource mapping; transmit power configuration; spatial transmission filter; and periodicity.

According to an eleventh example there is provided a method involving: a user equipment (UE) receiving downlink control information (DCI) to trigger transmission of a sounding reference signal (SRS) used for determining the position of the UE; and the UE transmitting the SRS used for determining the position of the UE.

In some instances, the UE transmits the SRS in a previously configured active uplink bandwidth part (BWP) at a location identified in the DCI.

In some instances, the UE transmits the SRS in a dedicated uplink bandwidth part (UL BWP).

In some instances, the UE transmits the SRS in a portion of an uplink bandwidth part (UL BWP) identified in the DCI.

According to a twelfth example there is provided a method involving: a base station transmitting to a user equipment (UE) downlink control information (DCI) to trigger transmission of a sounding reference signal (SRS) used for determining the position of the UE; and the base station receiving the SRS used for determining the position of the UE.

In some instances, the DCI includes information indicating a location for transmitting the SRS in a previously configured active uplink bandwidth part (BWP).

In some instances, the DCI includes information triggering the UE to transmit the SRS in a dedicated uplink bandwidth part (UL BWP).

In some instances, the DCI includes information indicating a location for transmitting the SRS in a portion of the uplink bandwidth part (UL BWP).

According to a thirteenth example there is provided a method involving: a user equipment (UE) updating a latency value defining a duration between the UE receiving a command to activate, de-activate or trigger transmission of a sounding reference signal (SRS) used for determining the position of the UE and the UE performing the activating, de-activating or triggering of the transmission of the SRS by the UE; the UE receiving the command to activate, de-activate or trigger the transmission of the SRS used for determining the position of the UE; and the UE transmitting the SRS used for determining the position of the UE based on the updated latency value.

In some instances, updating a latency value involves increasing the latency value to be equal to $XN_{slot}^{subframe,\mu}+1$ for activing or deactivating semi-persistent SRS (SP-SRS), where X and $N_{slot}^{subframe,\mu}$ are integer values.

In some instances, updating a latency value involves increasing the latency value, which is equal to K for triggering aperiodic SRS (AP-SRS), to a larger value than the current value of K, where K is an integer value.

The method of the thirteenth example further comprising receiving a new latency value to be used in updating an existing latency value used by the UE.

According to a fourteenth example there is provided a method involving: a base station transmitting to a user equipment (UE) a command to activate, de-activate or trigger transmission of SRS used for determining the position of the UE; the base station transmitting to a location management function (LMF) or a neighbouring base station a notification that the command to activate, de-activate or trigger transmission of SRS used for determining the position of the UE has been sent or will be sent to the UE; and the base station receiving the SRS used for determining the position of the UE.

The method of the fourteenth example further involving transmitting a new latency value to the UE that is different than an existing latency value used by the UE, the new latency value to be used to update a duration between the UE receiving the command to activate, de-activate or trigger transmission of a sounding reference signal (SRS) used for determining the position of the UE and the UE performing the command of activating, de-activating or triggering of the transmission of the SRS by the UE.

In some instances, wherein transmitting the new latency value involves transmitting a value equal to $XN_{slot}^{subframe,\mu}+1$ for deactivating semi-persistent SRS (SP-SRS), where X and $N_{slot}^{subframe,\mu}$ are integer values.

In some instances, transmitting the new latency value involves transmitting a latency value equal to K, which is larger than the current value of K for triggering aperiodic SRS (AS-SRS), where K is an integer value.

In some instances, the base station transmitting to the neighboring base station the notification that the command to activate, de-activate or trigger transmission of SRS used for determining the position of the UE will be sent to the UE occurs before the base station transmits to the UE the command to activate, de-activate or trigger transmission of SRS used for determining the position of the UE.

According to a fifteenth example there is provided a method involving: a base station receiving a notification that a command to activate, de-activate or trigger transmission of SRS used for determining the position of a user equipment (UE) has been sent or will be sent to the UE; and the base station receiving the SRS used for determining the position of the UE.

In the examples above the base station is a network device, such as, but not limited to a gNodeB, in a serving cell and a neighboring base station is a network device, such as, but not limited to a gNodeB, a cell neighboring the serving cell. Other examples of network devices are described above with reference to FIG. 1.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the figures or all of the portions schematically shown in the figures. Moreover, selected features of one example embodiment may be combined with selected features of other example embodiments.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method comprising:
   receiving a first message from a network device in a serving cell, wherein the first message indicates a configuration of at least one configured bandwidth (BW) dedicated for sounding reference signal (SRS) transmission used for determining a position of a user equipment (UE);
   sending the SRS transmission on the at least one configured BW to at least one of the network device in the serving cell and a network device in a neighboring cell;
   wherein the at least one configured BW comprises an active bandwidth part (BWP) or a positioning BW.

2. The method of claim 1, the method further comprising:
   receiving a second message from the network device in the serving cell, wherein the second message indicates a deactivation command for the at least one configured BW.

3. The method of claim 2, wherein the second message is an explicit indication to deactivate the SRS or an implicit indication to deactivate the SRS, wherein the implicit indication comprises at least one of:
   a location information;
   a location information acknowledgement;
   an activation command for SRS in a new configured BW;
   a delay period; and
   expiration of a timer.

4. The method of claim 3 further comprising receiving an indication of the delay period in:
   a radio resource control (RRC) message; or
   a downlink control information (DCI).

5. The method of claim 1, the method further comprising SRS activation in a different configured BW when the UE receives an implicit indication to deactivate the SRS or an explicit deactivation command for the SRS in the at least one configured BW.

6. An apparatus comprising:
   a processor; and
   a computer-readable medium having stored thereon instructions that when executed by the processor cause the apparatus to:
   receive a first message from a network device in a serving cell, wherein the first message indicates a configuration of at least one configured bandwidth (BW) dedicated for sounding reference signal (SRS) transmission used for determining a position of the apparatus;
   send the SRS transmission on the at least one configured BW to at least one of the network device in the serving cell and a network device in a neighboring cell;
   wherein the at least one configured BW comprises an active bandwidth part (BWP) or a positioning BW.

7. The apparatus of claim 6, further comprising instructions that when executed by the processor cause the apparatus to:
   receive a second message from the network device in the serving cell, wherein the second message indicates a deactivation command for the at least one configured BW.

8. The apparatus of claim 7, wherein the second message is an explicit indication to deactivate the SRS or an implicit indication to deactivate the SRS, wherein the implicit indication comprises at least one of:
   a location information;
   a location information acknowledgement;
   an activation command for SRS in a new configured BW;
   a delay period; and
   expiration of a timer.

9. The apparatus of claim 8 further comprising instructions that when executed by the processor cause the apparatus to receive an indication of the delay period in:
   a radio resource control (RRC) message; or
   a downlink control information (DCI).

10. The apparatus of claim 6, further comprising instructions that when executed by the processor cause the apparatus to perform SRS activation in a different configured BW when the apparatus receives an implicit indication to deactivate the SRS or an explicit deactivation command for the SRS in the at least one configured BW.

11. A method comprising:
   transmitting, by a network device, a first message to at least one user equipment (UE), wherein the first message indicates a configuration of at least one configured bandwidth (BW) dedicated for sounding reference signal (SRS) transmission used for determining a position of the UE;

receiving, by the network device, the SRS transmission from the at least one UE on the at least one configured BW;

wherein the at least one configured BW comprises an active bandwidth part (BWP) or a positioning BW.

12. The method of claim 11, the method further comprising:

transmitting, by the network device, a second message to the at least one UE, wherein the second message indicates a deactivation command for the at least one configured BW.

13. The method of claim 12, wherein the second message is an explicit indication to deactivate the SRS or an implicit indication to deactivate the SRS, wherein the implicit indication comprises at least one of:

the UE receiving location information;

the UE receiving a location information acknowledgement;

the UE receiving an activation command for SRS in a new configured BW;

a delay period; and expiration of a timer.

14. The method of claim 13 further comprising transmitting an indication of the delay period in:

a radio resource control (RRC) message; or a downlink control information (DCI).

15. The method of claim 11, the method further comprising SRS activation in a different configured BW when the UE receives an implicit indication to deactivate the SRS or an explicit deactivation command for the SRS in the at least one configured BW.

16. An apparatus comprising:

a processor; and a computer-readable medium having stored thereon instructions that when executed by the processor cause the apparatus to:

transmit a first message to at least one user equipment (UE), wherein the first message indicates a configuration of at least one configured bandwidth (BW) dedicated for sounding reference signal (SRS) transmission used for determining a position of the UE;

receive the SRS transmission from the at least one UE on the at least one configured BW;

wherein the at least one configured BW comprises an active bandwidth part (BWP) or a positioning BW.

17. The apparatus of claim 16, further comprising instructions that when executed by the processor cause the apparatus to:

transmit a second message from the network device in the serving cell, wherein the second message indicates a deactivation command for the at least one configured BW.

18. The apparatus of claim 17, wherein the second message is an explicit indication to deactivate the SRS or an implicit indication to deactivate the SRS, wherein the implicit indication comprises at least one of:

the UE receiving location information;

the UE receiving a location information acknowledgement;

the UE receiving an activation command for SRS in a new configured BW;

a delay period; and expiration of a timer.

19. The apparatus of claim 18 further comprising instructions that when executed by the processor cause the apparatus to transmit an indication of the delay period in:

a radio resource control (RRC) message; or a downlink control information (DCI).

20. The apparatus of claim 16, further comprising instructions that when executed by the processor cause the apparatus to perform SRS activation in a different configured BW when the UE receives an implicit indication to deactivate the SRS or an explicit deactivation command for the SRS in the at least one configured BW.

* * * * *